US010860272B2

(12) United States Patent
Eronen et al.

(10) Patent No.: US 10,860,272 B2
(45) Date of Patent: Dec. 8, 2020

(54) CAUSING RENDERING OF A CONTENT ITEM SEGMENT ON A BEAD APPARATUS

(71) Applicant: Nokia Technologies Oy, Espoo (FI)

(72) Inventors: Antti Eronen, Tampere (FI); Arto Lehtiniemi, Lempäälä (FI); Juha Arrasvuori, Tampere (FI); Jukka Holm, Tampere (FI)

(73) Assignee: Nokia Technologies Oy, Espoo (FI)

( * ) Notice: Subject to any disclaimer, the term of this patent is extended or adjusted under 35 U.S.C. 154(b) by 551 days.

(21) Appl. No.: 15/030,457

(22) PCT Filed: Oct. 28, 2013

(86) PCT No.: PCT/FI2013/051014
§ 371 (c)(1),
(2) Date: Apr. 19, 2016

(87) PCT Pub. No.: WO2015/063361
PCT Pub. Date: May 7, 2015

(65) Prior Publication Data
US 2016/0266660 A1    Sep. 15, 2016

(51) Int. Cl.
*G06F 3/14* (2006.01)
*G06F 3/0485* (2013.01)
(Continued)

(52) U.S. Cl.
CPC ............ *G06F 3/1446* (2013.01); *G06F 1/163* (2013.01); *G06F 3/033* (2013.01); *G06F 3/0338* (2013.01);
(Continued)

(58) Field of Classification Search
CPC ............................................. G06F 3/041–048
See application file for complete search history.

(56) References Cited

U.S. PATENT DOCUMENTS 5,757,929 A    5/1998  Wang et al.
6,216,490 B1 *  4/2001  Radley-Smith ...... A44C 5/0015
                                                    345/56
(Continued)

FOREIGN PATENT DOCUMENTS

CN    102077161 A    5/2011
CN    102722323      10/2012
(Continued)

OTHER PUBLICATIONS

Wacharamanotham et al., "The Interactive Bracelet: An Input Device for Bimanual Interaction", MobileHCI, Sep. 7-10, 2010, 4 pages.
(Continued)

*Primary Examiner* — Sanjiv D. Patel
(74) *Attorney, Agent, or Firm* — Alston & Bird LLP

(57) ABSTRACT

A method comprises receiving information associated with a content item, designating a first bead apparatus (716) to be associated with a first content item segment of the content item, the first content item segment being identified by a first content item segment identifier, causing display of a visual representation of the first content item segment identifier by the first bead apparatus (726), designating a second bead apparatus (712) to be associated with a second content item segment of the content item, the second content item segment being identified by a second content item segment identifier, causing display of a visual representation of the second content item segment identifier by the second bead apparatus (722), receiving information indicative of a selection input of the second bead apparatus, and causing rendering of the second content item segment based, at least in part, on the selection input (734). The causation of rendering comprises sending information indicative of a content item segment to a separate apparatus or causing sending of information indicative of a content item segment by another apparatus to a separate apparatus (732) such as a bead
(Continued)

apparatus, an electronic apparatus, a server, a computer, a laptop, a television, a phone and/or the like.

20 Claims, 11 Drawing Sheets

(51) Int. Cl.
   G06F 3/0338   (2013.01)
   G06F 3/0362   (2013.01)
   G06F 3/0486   (2013.01)
   G06F 1/16     (2006.01)
   G06F 3/033    (2013.01)
   G06F 3/0488   (2013.01)
   A44C 5/00     (2006.01)

(52) U.S. Cl.
   CPC .......... *G06F 3/0362* (2013.01); *G06F 3/0485* (2013.01); *G06F 3/0486* (2013.01); *G06F 3/0488* (2013.01); *G06F 3/14* (2013.01); *G06F 3/1454* (2013.01); *A44C 5/0015* (2013.01); *G09G 2300/026* (2013.01); *G09G 2340/145* (2013.01); *G09G 2354/00* (2013.01); *G09G 2360/04* (2013.01)

(56) References Cited

U.S. PATENT DOCUMENTS

| | | | |
|---|---|---|---|
| 6,920,606 | B1 | 7/2005 | Jablonski et al. |
| 8,098,141 | B2 | 1/2012 | Vanska et al. |
| 8,872,729 | B2 | 10/2014 | Lyons et al. |
| 9,122,249 | B2 | 9/2015 | Lyons et al. |
| 9,696,690 | B2 | 7/2017 | Nguyen et al. |
| 2003/0030595 | A1 | 2/2003 | Redley-Smith |
| 2005/0052852 | A1 | 3/2005 | Ono |
| 2005/0113081 | A1 | 5/2005 | Tushinsky et al. |
| 2005/0132290 | A1 | 6/2005 | Buchner et al. |
| 2005/0174302 | A1 | 8/2005 | Ishii |
| 2007/0075915 | A1* | 4/2007 | Cheon .................. G06F 1/1647 345/1.1 |
| 2007/0158376 | A1 | 7/2007 | Radley-Smith |
| 2007/0279852 | A1 | 12/2007 | Daniel et al. |
| 2008/0001764 | A1 | 1/2008 | Douglas et al. |
| 2008/0318636 | A1* | 12/2008 | Kim ..................... G06F 3/0486 455/566 |
| 2009/0104931 | A1 | 4/2009 | Chiang |
| 2009/0251419 | A1 | 10/2009 | Radley Smith |
| 2009/0273560 | A1* | 11/2009 | Kalanithi ................ G06F 3/017 345/156 |
| 2010/0004037 | A1 | 1/2010 | Ozawa |
| 2010/0029327 | A1 | 2/2010 | Jee |
| 2010/0064536 | A1 | 3/2010 | Caskey et al. |
| 2010/0217667 | A1 | 8/2010 | Mo |
| 2010/0228691 | A1 | 9/2010 | Yang et al. |
| 2010/0313143 | A1 | 12/2010 | Jung et al. |
| 2011/0059769 | A1 | 3/2011 | Brunolli |
| 2011/0102354 | A1* | 5/2011 | Fuyuno ................ G06F 1/1647 345/173 |
| 2011/0157022 | A1 | 6/2011 | Goldburt |
| 2011/0193805 | A1* | 8/2011 | Park ..................... G06F 1/1692 345/173 |
| 2011/0209102 | A1 | 8/2011 | Hinckley et al. |
| 2011/0291964 | A1* | 12/2011 | Chambers ............ G06F 1/1643 345/173 |
| 2012/0021684 | A1 | 1/2012 | Schultz et al. |
| 2012/0075173 | A1 | 3/2012 | Ashbrook et al. |
| 2012/0242596 | A1* | 9/2012 | Sip ..................... G06F 3/1446 345/173 |
| 2013/0024805 | A1 | 1/2013 | In et al. |
| 2013/0044215 | A1 | 2/2013 | Rothkopf et al. |
| 2013/0173658 | A1 | 7/2013 | Adelman et al. |
| 2013/0222270 | A1 | 8/2013 | Winkler et al. |
| 2013/0222271 | A1* | 8/2013 | Alberth ............... G06F 3/04886 345/173 |
| 2013/0271350 | A1* | 10/2013 | Lyons .................. G06F 3/1423 345/1.1 |
| 2013/0271355 | A1 | 10/2013 | Lyons et al. |
| 2013/0271389 | A1 | 10/2013 | Lyons et al. |
| 2013/0271390 | A1 | 10/2013 | Lyons et al. |
| 2013/0271392 | A1 | 10/2013 | Lyons |
| 2013/0271495 | A1 | 10/2013 | Nguyen et al. |
| 2014/0047379 | A1* | 2/2014 | Urawaki ............. G06F 3/04886 715/789 |
| 2014/0172548 | A1* | 6/2014 | Garlick .............. G06Q 30/0246 705/14.45 |
| 2014/0281956 | A1 | 9/2014 | Anderson et al. |
| 2014/0287728 | A1 | 9/2014 | Lim et al. |
| 2015/0185884 | A1 | 7/2015 | Magi |
| 2015/0258458 | A1 | 9/2015 | Zhang et al. |
| 2016/0117006 | A1 | 4/2016 | Lehtiniemi et al. |
| 2016/0239182 | A1 | 8/2016 | Eronen et al. |
| 2016/0266660 | A1 | 9/2016 | Eronen et al. |
| 2016/0266858 | A1 | 9/2016 | Eronen et al. |

FOREIGN PATENT DOCUMENTS

| | | |
|---|---|---|
| CN | 102891925 | 1/2013 |
| EP | 1259135 A1 | 11/2002 |
| EP | 1311126 | 5/2003 |
| EP | 1 259 135 B1 | 9/2006 |
| EP | 1754424 A1 | 2/2007 |
| EP | 1998260 A1 | 12/2008 |
| EP | 2154662 A2 | 2/2010 |
| EP | 2368455 A1 | 9/2011 |
| EP | 2 372 984 A | 10/2011 |
| EP | 2474168 A2 | 7/2012 |
| EP | 2549480 A1 | 1/2013 |
| GB | 2411552 A | 8/2005 |
| JP | 2001-125722 A | 5/2001 |
| KR | 2011-0067849 A | 6/2011 |
| WO | 2001/064070 A1 | 9/2001 |
| WO | WO 2011/029098 A2 | 3/2011 |
| WO | 2012108668 | 8/2012 |
| WO | WO 2013/097895 A | 7/2013 |
| WO | WO 2013/111239 A1 | 8/2013 |
| WO | 2014/204490 A1 | 12/2014 |
| WO | WO 2015/063361 A1 | 5/2015 |
| WO | WO 2015/063362 A1 | 5/2015 |

OTHER PUBLICATIONS

"MIT Media Lab: Siftables", Youtube, Retrieved on May 25, 2017, Webpage available at : http://www.youtube.com/watch?v=vbwzBBHtNGI.

"Toy Tiles That Talk to Each Other", TED, Retrieved on May 25, 2017, Webpage available at : https://www.ted.com/talks/david_merrill_demos_siftables_the_smart_blocks.

Mcnerny, "Tangible Programming Bricks: An Approach to Making Programming Accessible to Everyone", Thesis, Feb. 2000, pp. 1-86.

Dang Trung Kien, "A Review of 3D Reconstruction from Video Sequences", ISIS Technical Report Series, Draft version 0.1, 2005, 35 pages.

Ma et al., "An Invitation to 3-D Vision: From Images to Geometric Models", Interdisciplinary Applied Mathematics, vol. 26, 2003, 542 Pages.

International Search Report and Written Opinion received for corresponding Patent Cooperation Treaty Application No. PCT/FI2013/051016, dated Jul. 31, 2014, 16 pages.

International Search Report and Written Opinion received for corresponding Patent Cooperation Treaty Application No. PCT/FI2013/051017, dated Aug. 28, 2014, 14 pages.

Olberding et al., "Argumented Forearm: Exploring the Design Space of a Display-Enhanced Forearm", Proceedings of the 4th Augmented Human International Conference, 2013, pp. 9-12.

"EmoPulse Smile, Best Smartwatch So Far", YouTube, Retrieved on May 26, 2017, Webpage available at : https://www.youtube.com/watch?v=LzPorAgInco.

Office action received for corresponding European Patent Application No. 13795277.6, dated May 11, 2017, 8 pages.

(56) References Cited

OTHER PUBLICATIONS

Office action received for corresponding European Patent Application No. 13795278.4, dated May 17, 2017, 10 pages.
Office action received for corresponding European Patent Application No. 13798364.9, dated May 17, 2017, 8 pages.
Non-Final Office action received for corresponding U.S. Appl. No. 15/030,748, dated Jun. 14, 2017, 15 pages.
"Touch Screen Bracelet Tells You Weather and Reads Texys", PFSK, Retrieved on Jun. 22, 2017, Webpage available it : https://www.psfk.com/2012/03/touch-screen-bracelet-text.html.
International Search Report and Written Opinion received for corresponding Patent Cooperation Treaty Application No. PCT/FI2013/051014, dated Jul. 31, 2014, 14 pages.
"Leaked Footage: Nokia's Facet smartwatch concept", Oct. 17, 2013, retrieved from the Internet: URL:https://www.youtube.com/watch?v=Bxn_N4vHqXQ.
Kent Lyons et al. "Facet: A Multi-Segment Wrist Worn System", UIST'12, Proceedings of the Annual ACM Symposium on User Interface Software and Technology, Cambridge, Massachusetts, USA, Oct. 7, 2012, pp. 123-129.
International Search Report and Written Opinion from International Application No. PCT/US2013/047143, dated Mar. 25, 2014, 9 pages.
Notice of Allowance for U.S. Appl. No. 14/895,200 dated Oct. 5, 2017, 14 pages.
Office Action for U.S. Appl. No. 14/895,200 dated Apr. 24, 2017, 20 pages.
Office Action for U.S. Appl. No. 15/030,748 dated Dec. 1, 2017, 16 pages.
Office Action for Chinese Application No. 201380080571.4 dated Apr. 2, 2014, 8 pages.
Office Action for U.S. Appl. No. 15/031,287 dated Apr. 13, 2018, 11 pages.
Office Action for Chinese Application No. 201380080572.9 dated Apr. 18, 2018, with English Summary 9 pages.
Summons to attend oral proceedings pursuant to Rule 115(1) EPC for European Application No. 13 795 277.6 dated Mar. 26, 2018, 11 pages.
Summons to attend oral proceedings pursuant to Rule 115(1) EPC for European Application No. 13 795 278.4 dated Feb. 20, 2018, 12 pages.
Summons to attend oral proceedings pursuant to Rule 115(1) EPC for European Application No. 13 798 364.9 dated Apr. 5, 2018, 11 pages.
Office Action for Chinese Application No. 201380080571.4 dated Nov. 1, 2018, with English Translation, 13 pages.
Office Action for U.S. Appl. No. 15/031,287 dated Oct. 24, 2018.
Notice of Allowance for U.S. Appl. No. 15/030,748 dated Aug. 13, 2018.
Office Action for European Application No. 13795277.6 dated Nov. 22, 2018, 2 pages.
Office Action for European Application No. 13795277.6 dated Jan. 2, 2019, 7 pages.
Office Action for European Application No. 13795277.6 dated Jan. 4, 2019, 14 pages.
Extended European Search Report for Application No. EP 19162303.2 dated Jul. 19, 2019, 18 pages.
Decision to Grant European Application No. EP 13798364.9 dated Jun. 6, 2019, 2 pages.
Notice of Allowance for U.S. Appl. No. 15/031,287 dated Feb. 25, 2019.
Office Action for Chineses Application No. 2013800080572.9 dated Mar. 1, 2019, with English Summary 6 pages.
Office Action for European Application No. 13 795 278.4 dated Sep. 12, 2018, 4 pages.
Office Action for European Application No. 13 734 598.9 dated Sep. 19, 2018, 5 pages.
Office Action for Chinese Application No. 201380080572.9 dated Nov. 20, 2018, with English Summary 7 pages.

\* cited by examiner

CAUSING RENDERING OF A CONTENT ITEM SEGMENT ON A BEAD APPARATUS

RELATED APPLICATION

This application was originally filed as PCT Application No. PCT/FI2013/051014 filed Oct. 28, 2013.

TECHNICAL FIELD

The present application relates generally to causing rendering of a content item segment.

BACKGROUND

Electronic apparatuses are becoming increasing prevalent. Users are increasingly utilizing electronic apparatuses in conjunction with one or more additional apparatuses. It may be desirable to allow for convenient and natural interactions with user electronic apparatuses.

SUMMARY

Various aspects of examples of the invention are set out in the claims.

One or more embodiments may provide an apparatus, a computer readable medium, a non-transitory computer readable medium, a computer program product, and a method for receiving information associated with a content item, designating a first bead apparatus to be associated with a first content item segment of the content item, the first content item segment being identified by a first content item segment identifier, causing display of a visual representation of the first content item segment identifier by the first bead apparatus, designating a second bead apparatus to be associated with a second content item segment of the content item, the second content item segment being identified by a second content item segment identifier, causing display of a visual representation of the second content item segment identifier by the second bead apparatus, receiving information indicative of a selection input of the second bead apparatus, and causing rendering of the second content item segment based, at least in part, on the selection input.

One or more embodiments may provide an apparatus, a computer readable medium, a computer program product, and a non-transitory computer readable medium having means for receiving information associated with a content item, means for designating a first bead apparatus to be associated with a first content item segment of the content item, the first content item segment being identified by a first content item segment identifier, means for causing display of a visual representation of the first content item segment identifier by the first bead apparatus, means for designating a second bead apparatus to be associated with a second content item segment of the content item, the second content item segment being identified by a second content item segment identifier, means for causing display of a visual representation of the second content item segment identifier by the second bead apparatus, means for receiving information indicative of a selection input of the second bead apparatus, and means for causing rendering of the second content item segment based, at least in part, on the selection input.

In at least one example embodiment, causation of rendering comprises rendering of the second content item segment.

In at least one example embodiment, causation of rendering comprises sending information indicative of the second content item segment to a separate apparatus.

In at least one example embodiment, the information indicative of the second content item segment relates to a rendering directive.

In at least one example embodiment, rendering comprises at least one of display of visual information or actuation of audio information.

One or more example embodiments further perform designation of the second bead apparatus to be associated with a third content item segment of the content item, the third content item segment being identified by a third content item segment identifier, and causation of display of a visual representation of the third content item segment identifier by the second bead apparatus.

In at least one example embodiment, the first content item segment relates to a content item segment that is being rendered.

One or more example embodiments further perform determination that the content item segment that is being rendered is a third content item segment, designation of the first bead apparatus to be associated with the third content item segment of the content item based, at least in part, on the determination that the content item segment that is being rendered is a third content item segment, the third content item segment being identified by a third content item segment identifier, and causation of display of a visual representation of the third content item segment identifier by the first bead apparatus.

One or more example embodiments further perform designation of the second bead apparatus to be associated with a fourth content item segment of the content item, based, at least in part, on the first bead apparatus being associated with the third content item segment, the fourth content item segment being identified by a fourth content item segment identifier, and causation of display of a visual representation of the fourth content item segment identifier by the second bead apparatus.

One or more example embodiments further perform receipt of information indicative of a current rendering position of the content item corresponding with the third content item segment, wherein determination that the content item segment that is being rendered is a third content item segment is based, at least in part, on the information indicative of the current rendering position of the content item corresponding with the third content item segment.

In at least one example embodiment, designation of the first bead apparatus to be associated with the first content item segment of the content item and designation of the second bead apparatus to be associated with the second content item segment of the content item are based at least in part, on a spatial relationship between the first bead apparatus and the second bead apparatus.

In at least one example embodiment, the spatial relationship relates to adjacency of the first bead apparatus and the second bead apparatus, such that no content item segment that is chronologically between the first content item segment and the second content item segment is associated with another bead apparatus.

In at least one example embodiment, the spatial relationship relates to adjacency of the first bead apparatus and the second bead apparatus, and the first content item segment is adjacent to the second content item segment within the content item.

In at least one example embodiment, the spatial relationship relates to adjacency of the first bead apparatus and the second bead apparatus, and the first content item segment is separated from the second content item segment within the content item, by a predetermined content item segment interval.

In at least one example embodiment, the predetermined content item segment interval relates to a predetermined number of content item segments failing to be associated with a bead apparatus between each content item segment associated with a bead apparatus.

In at least one example embodiment, the first bead apparatus is adjacent to the second bead apparatus, and further comprising designation of a third bead apparatus to be associated with a third content item segment of the content item, the third content item segment being identified by a third content item segment identifier, and the third bead apparatus being adjacent to the second bead apparatus, causation of display of a visual representation of the third content item segment identifier by the third bead apparatus, receipt of information indicative of a scroll input associated with at least one of the first bead apparatus, the second bead apparatus, or the third bead apparatus, designation of the first bead apparatus to be associated with the second content item segment of the content item, the second content item segment being identified by the second content item segment identifier, based, at least in part, on the scroll input, causation of display of a visual representation of the second content item segment identifier by the first bead apparatus, designation of the second bead apparatus to be associated with the third content item segment of the content item, the third content item segment being identified by the third content item segment identifier, based, at least in part, on the scroll input, causation of display of a visual representation of the third content item segment identifier by the second bead apparatus, designation of the third bead apparatus to be associated with a fourth content item segment of the content item, the fourth content item segment being identified by a fourth content item segment identifier based, at least in part, on the scroll input, and causation of display of a visual representation of the fourth content item segment identifier by the third bead apparatus.

One or more example embodiments further perform receipt of additional information associated with the content item.

In at least one example embodiment, the additional information is received from at least one of memory or a separate apparatus.

In at least one example embodiment, the selection input is a tap input associated with the second bead apparatus.

In at least one example embodiment, the selection input is a rotation input associated with the second bead apparatus.

In at least one example embodiment, the content item segment is a portion of the content item, and the content item segment is based, at least in part, on a type of the content item.

In at least one example embodiment, the content item comprises video content and the content item segment is a scene associated with the video content.

In at least one example embodiment, the content item segment identifier associated with the scene is at least one of a keyframe identifying the scene, a position indicator, or a scene identifier identifying the scene.

In at least one example embodiment, the representation of the content item segment identifier is, at least one of, a thumbnail image, a visual representation of the scene, or metadata associated with the scene.

In at least one example embodiment, the content item comprises audio content and the content item segment is a song associated with the audio content.

In at least one example embodiment, the content item segment identifier associated with the song is at least one of a title, a position indicator, or a song identifier identifying the song.

In at least one example embodiment, the representation of the content item segment identifier is, at least one of, a thumbnail image, an album cover, or metadata associated with the song.

In at least one example embodiment, the content item comprises document content and the content item segment is a chapter associated with the document content.

In at least one example embodiment, the content item segment identifier associated with the chapter is at least one of a title, a subtitle, a position indicator, or a chapter identifier identifying the chapter.

In at least one example embodiment, the representation of the content item segment identifier is, at least one of, a thumbnail image, a visual representation of the chapter, a textual representation of the chapter, or metadata associated with the chapter.

In at least one example embodiment, the content item comprises document content and the content item segment is a bookmark associated with the document content.

In at least one example embodiment, the content item segment identifier associated with the bookmark is at least one of a title, a subtitle, a position indicator, or a bookmark identifier identifying the bookmark.

In at least one example embodiment, the representation of the content item segment identifier is, at least one of, a thumbnail image, a visual representation of the bookmark, a textual representation of the bookmark, or metadata associated with the bookmark.

In at least one example embodiment, the content item comprises website content and the content item segment is a webpage associated with the website content.

In at least one example embodiment, the content item segment identifier associated with the webpage is, at least one of a title, a uniform resource locator address, or a webpage identifier identifying the webpage.

In at least one example embodiment, the representation of the content item segment identifier is, at least one of, a thumbnail image, a visual representation of the webpage, a textual representation of the webpage, or metadata associated with the webpage.

In at least one example embodiment, herein the content item comprises browser history content and the content item segment is a webpage associated with the browser history content.

In at least one example embodiment, the content item segment identifier associated with the webpage is at least one of a title, a uniform resource locator address, a visual representation of the webpage, or a webpage identifier identifying the webpage.

In at least one example embodiment, the representation of the content item segment identifier is, at least one of, a thumbnail image, a visual representation of the webpage, a textual representation of the webpage, or metadata associated with the webpage.

In at least one example embodiment, the information associated with the content item comprises information indicative of the content item.

One or more example embodiments further perform determination of the first content item segment of the content item based, at least in part, on the content item, determination of the first content item segment identifier identifying the content item segment based, at least in part, on the first content item segment, and determination of the visual representation of the first content item segment identifier based, at least in part, on the first content item segment identifier.

In at least one example embodiment, the information associated with the content item comprises information indicative of the content item and information indicative of the first content item segment.

One or more example embodiments further perform determination of first content item segment identifier identifying the content item segment based, at least in part, on the first content item segment, and determination of the visual representation of the first content item segment identifier based, at least in part, on the first content item segment identifier.

In at least one example embodiment, the information associated with the content item comprises information indicative of the content item, information indicative of the first content item segment, and information indicative of the first content item segment identifier.

One or more example embodiments further perform determination of the visual representation of the first content item segment identifier based, at least in part, on the first content item segment identifier.

In at least one example embodiment, the information associated with the content item comprises information indicative of the content item, information indicative of the first content item segment, information indicative of the first content item segment identifier, and information indicative of the visual representation of the first content item segment identifier.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
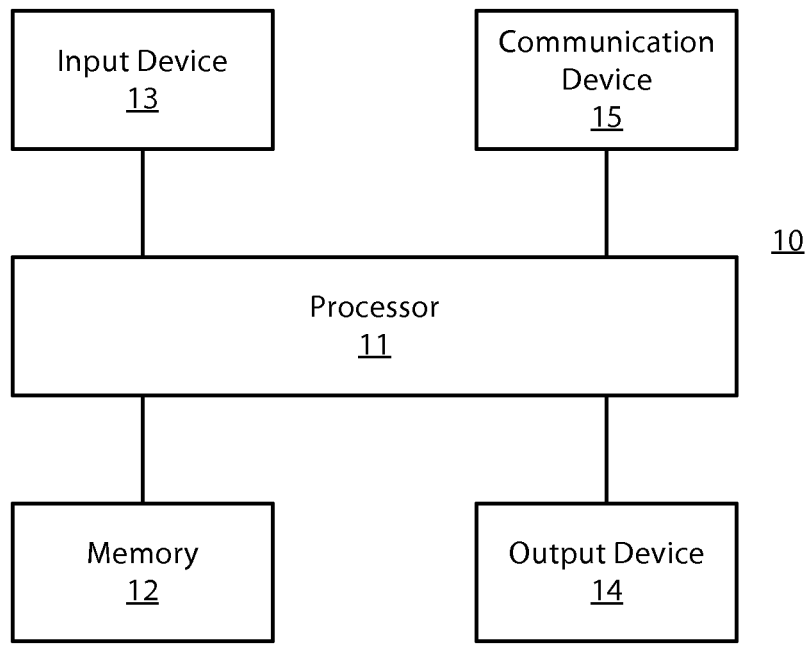
FIG. 1 is a block diagram showing an apparatus according to at least one example embodiment.

An embodiment of the invention and its potential advantages are understood by referring to FIGS. 1 through 11 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, a bead apparatus, a wearable electronic apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input comprises information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
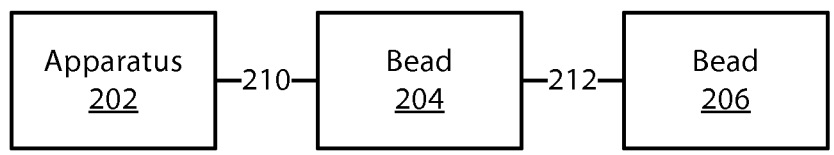
FIGS. 2A-2B are block diagrams showing apparatus communication according to at least one example embodiment.
Figure 2B:
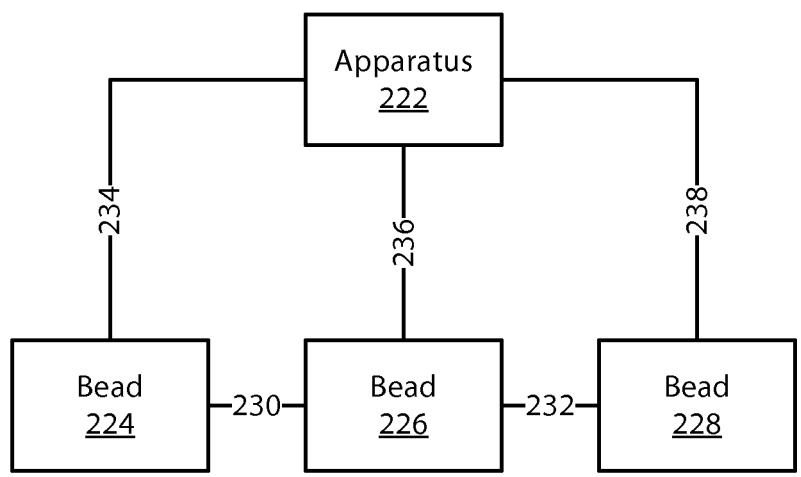

FIGS. 2A-2B are block diagrams showing apparatus communication according to at least one example embodiment. The examples of FIGS. 2A-2B are merely examples and do not limit the scope of the claims. For example, apparatus count may vary, bead apparatus count may vary, communication channels may vary, and/or the like.

As electronic apparatuses becoming increasingly prevalent, users may desire to interact with one or more electronic apparatuses in a convenient manner. For example, a user may desire to interact with their electronic apparatus by way of one or more separate electronic apparatuses. In at least one example embodiment, a separate electronic apparatus is a bead apparatus. The bead apparatus may be similar as described regarding FIGS. 4A-4B.

In some circumstances, a user may desire to utilize two or more bead apparatus in conjunction with each other. In at least one example embodiment, a first bead apparatus and a second bead apparatus communicate directly via a direct communication channel between the first bead apparatus and the second bead apparatus. A direct communication channel may, for example, be a near field communication channel, a wireless local area network communication channel, a Bluetooth communication channel, a wired communication channel, and/or the like. In one or more example embodiments, the first bead apparatus and the second bead apparatus communicate indirectly via an indirect communication channel by way of at least a third bead apparatus. For example, the first bead apparatus may be in direct communication with the intermediate third bead apparatus which, in turn, may be in direct communication with the second bead apparatus. The first bead apparatus may, for example, communicate with the second bead apparatus via the third bead apparatus.

In some circumstances, it may be desirable to centrally manage bead apparatus communication from a control apparatus. For example, the control apparatus may centrally orchestrate bead apparatus operation, communication, and/or the like. The control apparatus may, for example, be a tablet, cellphone, laptop, server, electronic apparatus, and/or the like. In at least one example embodiment, the control apparatus is a bead apparatus. For example, in the case of a first bead apparatus, a second bead apparatus, and a third bead apparatus, the first bead apparatus may manage operations, communications, and/or the like associated with the second bead apparatus and/or the third bead apparatus.

FIG. 2A is a block diagram showing apparatus communication according to at least one example embodiment. In the example of FIG. 2A, apparatus 202 is a control apparatus and each of beads 204 and 206 is a bead apparatus. In the example of FIG. 2A, apparatus 202 is in direct communication with bead 204 via communication channel 210. Bead 204 is in direct communication with bead 206 via communication channel 212. In the example of FIG. 2A, apparatus 202 is in indirect communication with bead 206 via an indirect communication channel by way of bead 204 and communication channels 210 and 212. For example, apparatus 202 may communicate with bead 204 via communication channel 210. Bead 204 may, subsequently, communicate with bead 206 via communication channel 212. Apparatus 202 may cause bead 204 to communicate with bead 206, may cause bead 204 to forward communication to bead 206, and/or the like. Although the example of FIG. 2A illustrates a control apparatus and two bead apparatus, additional bead apparatus may be in communication with apparatus 202, bead 204, and/or bead 206.

FIG. 2B is a block diagram showing apparatus communication according to at least one example embodiment. In the example of FIG. 2B, apparatus 222 is a control apparatus and each of beads 224, 226, and 228 is a bead apparatus. In the example of FIG. 2B, apparatus 222 is in direct communication with bead 224, bead 226, and bead 228 via communication channels 234, 236, and 238, respectively. In the example of FIG. 2B, bead 224 is in direct communication with bead 226 via communication channel 230. Bead 226 is in direct communication with bead 228 via communication channel 232. In the example of FIG. 2B, bead 224 is in indirect communication with bead 228 via an indirect communication channel by way of bead 226 and communication channels 230 and 232. For example, bead 224 may communicate with bead 226 via communication channel 230. Bead 226 may, subsequently, communicate with bead 228 via communication channel 232. Bead 224 may cause bead 226 to communicate with bead 228, may cause bead 226 to forward communication to bead 228, and/or the like. Additionally, each of beads 224, 226, and 228 may be in indirect communication with one another by way of apparatus 222 via communication channels 234, 236, and 238, respectively. Although the example of FIG. 2B illustrates a control apparatus and three bead apparatus, additional bead apparatus may be in communication with apparatus 222, bead 224, bead 226, and/or bead 228.

Figure 3:
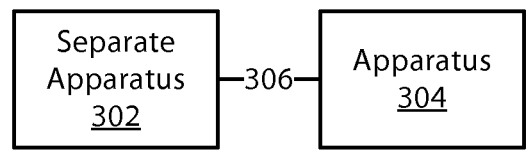
FIG. 3 is a block diagram showing apparatus communication according to at least one example embodiment.

FIG. 3 is a block diagram showing apparatus communication according to at least one example embodiment. The example of FIG. 3 is merely an example and does not limit the scope of the claims. For example, separate apparatus count may vary, apparatus count may vary, communication channels may vary, and/or the like.

In some circumstances, it may be desirable to allow for remote interaction with a bead apparatus. For example, a user may desire his or her bead apparatus to communicate with a separate apparatus. In at least one example embodiment, an apparatus communicates with a separate apparatus. The separate apparatus may, for example, be a server, a database, a computer, a laptop, and/or the like. Such communication may comprise sending of information to the separate apparatus, receiving information from the separate apparatus, and/or the like. In at least one example embodiment, a communication channel between the separate apparatus and the control apparatus is a cellular communication channel, a wireless local area network communication channel, a local area network communication channel, a wide area network communication channel, a Bluetooth communication channel, a near field communication channel, and/or the like. In at least one example embodiment, the separate apparatus communicates with a bead apparatus acting as a control apparatus for one or more additional bead apparatuses.

FIG. 3 is a block diagram showing apparatus communication according to at least one example embodiment. In the example of FIG. 3, separate apparatus 302 is a server, a database, a computer, a laptop, and/or the like. Apparatus 304 may, for example, be a control apparatus, a bead apparatus, and/or the like. In the example of FIG. 3, separate apparatus 302 and apparatus 304 are in communication via communication channel 306. Communication channel 306 may, for example, be a cellular communication channel, a wireless local area network communication channel, a local area network communication channel, a wide area network communication channel, a Bluetooth communication channel, a near field communication channel, and/or the like. Although the example of FIG. 3 illustrates a single separate apparatus and a single apparatus, one or more additional separate apparatus and/or apparatus may be in communication with separate apparatus 302 and/or apparatus 304. In the example of FIG. 3, apparatus 304 may relate to apparatus 202 of FIG. 2A and/or apparatus 222 of FIG. 2B.

Figure 4A:
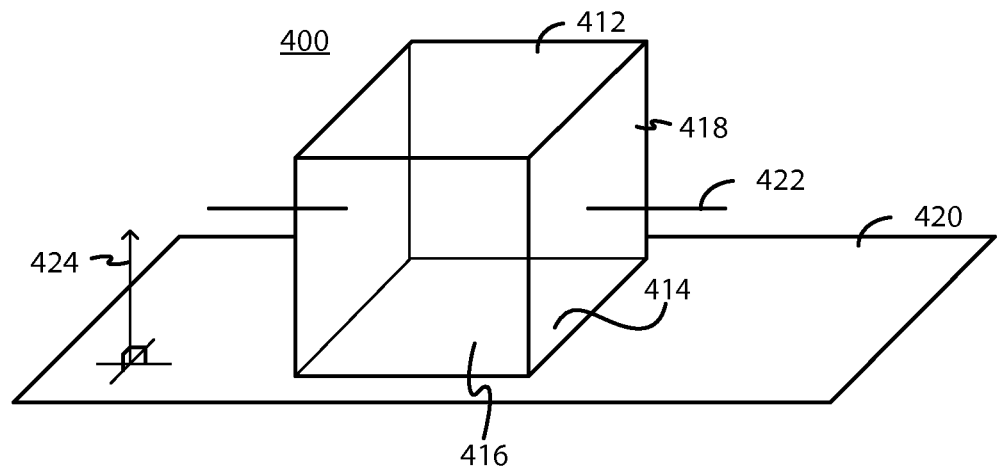
FIGS. 4A-4B are illustrations showing an apparatus according to at least one example embodiment.
Figure 4B:
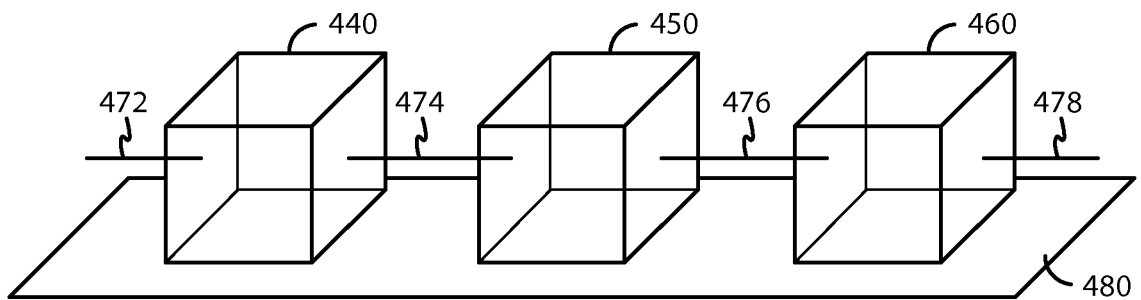

FIGS. 4A-4B are illustrations showing an apparatus according to at least one example embodiment. The examples of FIGS. 4A-4B are merely examples and do not limit the scope of the claims. For example, bead apparatus size, shape, design, and/or count may vary, bead apparatus arrangement may vary, connections between bead apparatuses may vary, and/or the like.

In some circumstances, a user may desire to utilize a bead apparatus as a companion apparatus. For example, a user may desire to use one or more bead apparatus in conjunction with an electronic apparatus, such as a phone, a tablet, and/or the like. In such an example, the user may desire to utilize the bead apparatus as a separate display and/or input device for use in conjunction with their electronic apparatus, for independent use, and/or the like. In at least one example embodiment, a bead apparatus relates to a display apparatus. In one or more example embodiments, a bead apparatus is a cube, a sphere, a rectangular prism, a triangular prism, a cylindrical prism, a trapezoidal prism, and/or the like. In at least one example embodiment, a bead apparatus comprises a display, a display and another display, and/or the like.

FIG. 4A is an illustration showing an apparatus according to at least one example embodiment. In the example of FIG. 4A, bead apparatus 400 is resting on surface 420. Surface 420 may be the nearest surface associated with bead apparatus 400. In the example of FIG. 4A, surface 420 is associated with normal 424. Normal 424 related to a geometric normal associated with the plane of surface 420 and points in a direction perpendicular to surface 420. Bead apparatus 400 comprises sides 412, 414, 416, and 418. In the example of FIG. 4A, side 412 is the side of bead apparatus 400 facing in the direction of geometric normal 424. Side 414 is a side of bead apparatus 400 opposite of side 412. In the example of FIG. 4A, side 414 rests on surface 420. In the example of FIG. 4A, side 416 is a non-axial side of bead apparatus 400 and side 418 is an axial side of bead apparatus 400. Bead apparatus 400 may be configured to rotate about axis 422. In the example of FIG. 4A, axis 422 is centered within side 418 and passes through bead apparatus 400 at an angle perpendicular to side 418. Each of sides 412, 414, 416, and 418 may comprise a display. Although the example of FIG. 4A illustrates a 6-sided cube, bead apparatus 400 may be a sphere, a rectangular prism, a triangular prism, a cylindrical prism, a trapezoidal prism, and/or the like.

Bead apparatus 400 may be rotatable about axis 422. For example, as illustrated, side 412 faces in the direction of normal 424 associated with surface 420. Bead apparatus may be rotated, transitioned, and/or re-oriented about axis 422 such that side 416 faces in the direction of normal 424 associated with surface 420 and side 412 faces in a direction perpendicular to normal 424. In such an example, bead apparatus 400 may determine such a transition in orientation by way of an orientation sensor, an accelerometer, orientation with respect to another bead apparatus, and/or the like.

In some circumstances, it may be desirable to determine an orientation of a bead apparatus. In at least one example embodiment, a bead apparatus may be rotatable along a specific axis. For example, a bead apparatus 400 may comprise a display on side 416 and a display on side 412. In such an example, bead apparatus 400 may be configured to rotate along axis 422. In some circumstances, it may be desirable to modify utilization of a display and another display of a bead apparatus based, at least in part, on rotation of the bead apparatus about an axis of the bead apparatus. In at least one example embodiment, an apparatus determines that a first bead apparatus has transitioned from a first orientation to a second orientation. For example, that bead apparatus 400 has changed orientation. The first orientation may, for example, be an orientation of the bead apparatus such that side 412 faces in a direction of normal 424, and side 416 faces a direction perpendicular to normal 424. The second orientation may, for example, be an orientation of the bead apparatus such that side 416 faces in the direction of normal 424, and side 412 faces the direction perpendicular to normal 424. In at least one example embodiment, the direction is a direction that corresponds with a normal angle to a nearest surface of a user. The nearest surface may, for example, relate to a surface of the user upon which the first bead apparatus is worn. For example, the nearest surface associated with a bead apparatus comprised by a bracelet of bead apparatuses may be the nearest surface of a user's wrist. The nearest surface associated with a bead apparatus comprised by a necklace of bead apparatuses may be the nearest surface of the user's neck, chest, shoulders, and/or the like. The nearest surface associated with a bead apparatus lying on a table may be the surface of the table. In one or more example embodiments, the determination that a bead apparatus has transitioned from a first orientation to a second orientation occurs absent user input indicative of the transition. For example, the apparatus may determine a transition of orientation based, at least in part, on an orientation sensor, an accelerometer, orientation with respect to another bead apparatus, and/or the like.

In some circumstances, it may be desirable to associate a specific display of a bead apparatus with a specific direction. For example, a specific display of a bead apparatus may be designated as a top display, a side display, an inner display, an outer display, a primary display, and/or the like. In at least one example embodiment, a predetermined direction is a direction that corresponds with a normal angle to a nearest surface of a user. In one or more example embodiments, another predetermine direction is a direction that is perpendicular to the first predetermined direction, an angle that corresponds with a known angle of a display of a bead apparatus, and/or the like. For example, as illustrated in FIG. 4A, side 412 faces the predetermined direction, the direction that corresponds with normal 424, and side 416 faces the other predetermined direction, the direction that is perpendicular to the predetermined direction and perpendicular to normal 424.

In at least one example embodiment, the apparatus may utilize a motion sensor, such as an accelerometer, a gyroscope, etc. to determine rotation of the apparatus. In another example, the apparatus may determine rotation by way of measure movement of the bead apparatus relative to a strand to which the bead apparatus is connected. For example, there may be a sensor that measures amount of rotation relative to the strand. It should be understood that there are many available sensors and methodologies that may be applicable to receiving a rotation input, and that many sensor and methodologies will emerge in the future, and that the scope of the claims are not limited in any way by sensors and/or methodologies for receiving an input indicative of rotation.

FIG. 4B is an illustration showing an apparatus according to at least one example embodiment. In the example of FIG. 4B, bead apparatus 440 is connected to bead apparatus 450, bead apparatus 450 which is in turn connected to bead apparatus 460. Each of bead apparatuses 440, 450, and 460 is resting on surface 480. In the example of FIG. 4B, surface 480 may be the nearest surface associated with bead apparatuses 440, 450, and 460. In the example of FIG. 4B, bead apparatus 440 is configured to connect to one or more additional bead apparatuses in the direction of axis 472. Bead apparatus 460 is configured to connect to one or more additional bead apparatuses in the direction of axis 478. In the example of FIG. 4B, connections 474 and 476 relate to a chain, a tether, a wire, a communication link, and/or the like running through the rotatable axis of bead apparatus 440, 450, and 460. In the example of FIG. 4B, a length of connection 474 relates to a bead apparatus spacing between bead apparatus 440 and 450. A length of connection 476 relates to a bead apparatus spacing between bead apparatus 450 and 460. Although the example of FIG. 4B illustrates three bead apparatuses connected in a straight line, bead apparatuses 440, 450, and 460 may be associated with one or more additional bead apparatuses and/or bead apparatus to bead apparatus connections. For example, bead apparatus 440 and bead apparatus 460 may be connected, forming a three bead apparatus loop.

In some circumstances, it may be desirable to utilize a plurality of bead apparatuses in conjunction with one another. For example, multiple bead apparatuses may be joined into a chain that may be worn by a user, carried by a user, and/or the like. In at least one example embodiment, multiple bead apparatuses are configured as a bracelet, a necklace, a belt, an earring, and/or the like. In some circumstances, it may be desirable to determine a relative position of a bead apparatus with respect to another bead apparatus, for example, to coordinate use of the two bead apparatuses, to arrange utilization of the two bead apparatuses, and/or the like. In at least one example embodiment, an apparatus determinates a position of a bead apparatus and a position of another bead apparatus. For example, the determination of the position of the bead apparatus and the position of the other bead apparatus may occur absent user input indicative of the position of the bead apparatus and the position of the other bead apparatus, may occur based, at least in part, on user input indicative of the position of the bead apparatus and the position of the other bead apparatus, and/or the like. In the example of FIG. 4B, determination of a position of bead 440 and bead 450 may be based, at least in part, on user input indicating that bead 440 is positioned to the left of bead 450, may be based, at least in part, on bead 440 communicating with bead 450 to determine relative positions, and/or the like. In at least one example embodiment, a position of a bead apparatus relates to a predetermined position of the bead apparatus and the position of another bead apparatus relates to a position relative to the position of the bead apparatus. For example, the predetermined position of the bead apparatus may be a first position, a second position, a last position, a middle position, and/or the like. The position of the other bead apparatus may be a position adjacent to the first bead apparatus, opposite the first bead apparatus, below the first bead apparatus, and/or the like. In the example of FIG. 4B, bead 450 is positioned adjacent and to the right of bead 440.

In some circumstances, it may be desirable to determine positions of multiple bead apparatuses such that an overall arrangement of bead apparatuses may be determined. For example, when using multiple bead apparatuses in conjunction with each other, it may be desirable to utilize a display from each bead apparatus, to utilize the bead apparatus for input, to display sequential information on the bead apparatuses, and/or the like. In at least one example embodiment, an apparatus determines a bead apparatus arrangement. The bead apparatus arrangement may, for example, comprise information indicative of relative position for at least two bead apparatuses. In one or more example embodiment, determination of a bead apparatus arrangement comprises receiving information indicative of a bead apparatus position from at least one bead apparatus, and the bead apparatus arrangement is based, at least in part, on the bead apparatus position of the bead apparatus. For example, in the case of a first bead apparatus operating as a control apparatus, a position of the first bead apparatus may be a predetermined position. The first bead apparatus may, for example, receive information indicative of a position of a second bead apparatus with respect to the position of the first bead apparatus. For example, the first bead apparatus may receive information indicative of the second bead apparatus being positioned adjacent to the first bead apparatus, separated from the first bead apparatus by at least a third bead apparatus, and/or the like. For example, as illustrated in FIG. 4B, bead 440 may receive information from bead 450 indicating that bead 450 is adjacent to bead 440. In another example, bead 440 may receive information from bead 460 indicating that bead 460 is separated from bead 440 by bead 450. In such an example, bead 440 may receive information indicative of the position of bead 460 by way of bead 450 such that bead 440 may determine that bead 450 is positioned adjacent to bead 440 and bead 460 is positioned adjacent to bead 450.

In some circumstances, bead apparatuses may be arranged by a user in a predefined and/or predetermined arrangement. For example, determination of a bead apparatus arrangement may be based, at least in part, on a predetermined bead apparatus arrangement. In one or more example embodiments, a predetermined bead apparatus arrangement comprises information indicative of a predetermined arrangement of a number of bead apparatus. For example, a bead apparatus may be predetermined to be positioned adjacent to another bead apparatus. The other bead apparatus may, for example, be predetermined to be positioned between the bead apparatus and a different bead apparatus. In the example of FIG. 4B, the arrangement of the bead apparatuses such that bead 440 is adjacent to bead 450 and bead 450 is adjacent to 460 may an arrangement indicated by a predetermined bead apparatus arrangement. In at least one example embodiment, a predetermined bead apparatus arrangement comprises information indicative of a predetermined bead apparatus spacing. The predetermined bead apparatus spacing may, for example, relate to a gap between a bead apparatus and another bead apparatus. In some circumstances, it may be desirable to communicate a bead apparatus arrangement to a separate apparatus. For example, a separate apparatus may benefit from information indicative of the bead apparatus arrangement for purposes associated with determining, generating, modifying, communicating, and/or the like information and/or data to multiple bead apparatuses described by the bead apparatus arrangement. In at least one example embodiment, the apparatus sends information indicative of a bead apparatus arrangement of the first bead apparatus and the second bead apparatus to a separate apparatus. The separate apparatus may, for example, relate to a server, a database, a computer, a laptop, and/or the like.

FIGS. 5A-5D are diagrams illustrating input associated with a bead apparatus according to at least one example embodiment. The examples of FIGS. 5A-5D are merely examples and do not limit the scope of the claims. For example, type of input may vary, configuration of the bead apparatus may vary, and/or the like.

In at least one example embodiment, a bead apparatus receives an indication of an input. The bead apparatus may receive the indication of the input from an input device, such as input device 13 of FIG. 1, from a separate apparatus, and/or the like. The indication comprise information that indicates occurrence of the input, describes at least one characteristic of the input, logistical information associated with the input, and/or the like. For example, the indication of the input may comprise information indicating a direction of the input, a position associated with the input, an input device associated with the input, time information associated with receipt of the input, and/or the like.

Figure 5A:
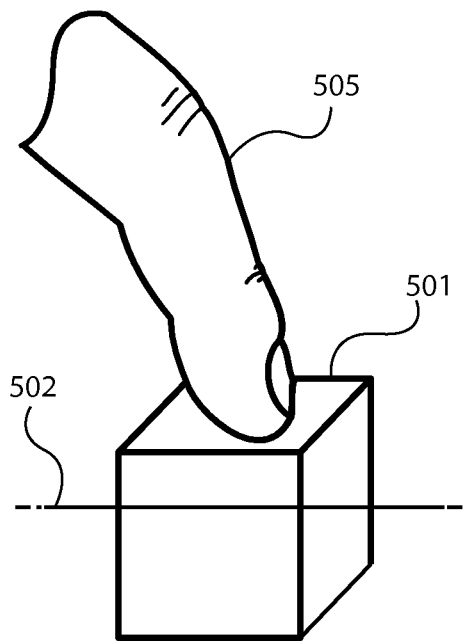
FIGS. 5A-5D are diagrams illustrating input associated with a bead apparatus according to at least one example embodiment.

FIG. 5A is a diagram illustrating a touch input associated with a bead apparatus according to at least one example embodiment. In at least one example embodiment, the input described by the example of FIG. 5A is a tap input. The example of FIG. 5A illustrates bead apparatus 501 mounted on strand 502. In the example of FIG. 5A, finger 505 is performing a touch input on bead apparatus 501. A touch input may be an input associated with contact on the surface of the bead apparatus, close proximity to the apparatus, and/or the like. It should be understood that there are many available touch sensors and touch detection methodologies, and that many touch sensor and touch input methodologies will emerge in the future, and that the scope of the claims are not limited in any way by touch sensors and/or touch input methodologies.

In at least one example embodiment, the touch input may be related to a surface of the apparatus. For example, the example of FIG. 5A illustrates a touch input related to the surface of bead apparatus 501 that is currently upward from strand 502. In at least one example embodiment, the indication of the input identifies a surface related to the touch input. For example, the indication of the input may identify the surface based, at least in part, on a relative identification, such as a descriptor relating to the surface in relation to the user, in relation to a surface of the user upon which the bead apparatus is being worn, a surface of the bead apparatus in relation to a strand, and/or the like. In another example, the indication of the input may identify the surface in relation to a non-relative identification. For example, the indication of the input may identify the surface without regard for the interrelationship between the surface and any point of reference unassociated with the bead apparatus.

Figure 5B:
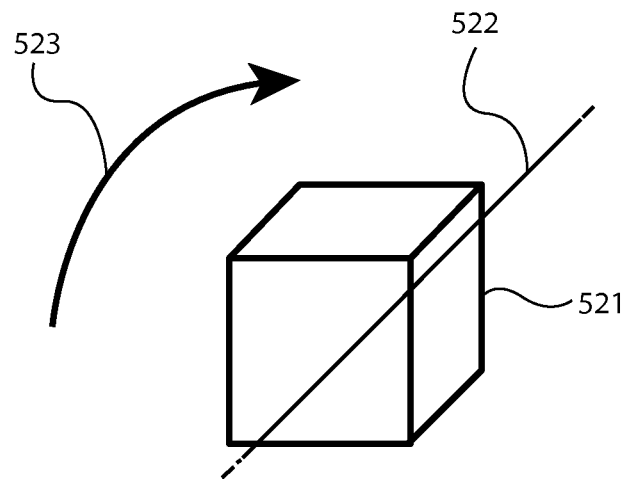

FIG. 5B is a diagram illustrating an input indicative of rotation associated with a bead apparatus according to at least one example embodiment. In at least one example embodiment, the input described by the example of FIG. 5B is a rotation input. In the example of FIG. 5B, force 523 is acting upon bead apparatus 521 to cause rotation of bead apparatus 521. In at least one example embodiment, the rotation relates to rotation around a suspension axis of the bead apparatus, such as around a strand to which the bead apparatus is mounted.

The bead apparatus may determine an input indicative of rotation by way of a sensor, such as a motion sensor, a position sensor, and/or the like. For example, the apparatus may utilize a motion sensor, such as an accelerometer, a gyroscope, etc. to determine rotation of the apparatus. In another example, the apparatus may determine rotation by way of measure movement of the bead apparatus relative to the strand. For example, there may be a sensor that measures amount of rotation relative to the strand. It should be understood that there are many available sensors and methodologies that may be applicable to receiving a rotation input, and that many sensor and methodologies will emerge in the future, and that the scope of the claims are not limited in any way by sensors and/or methodologies for receiving an input indicative of rotation.

Figure 5C:
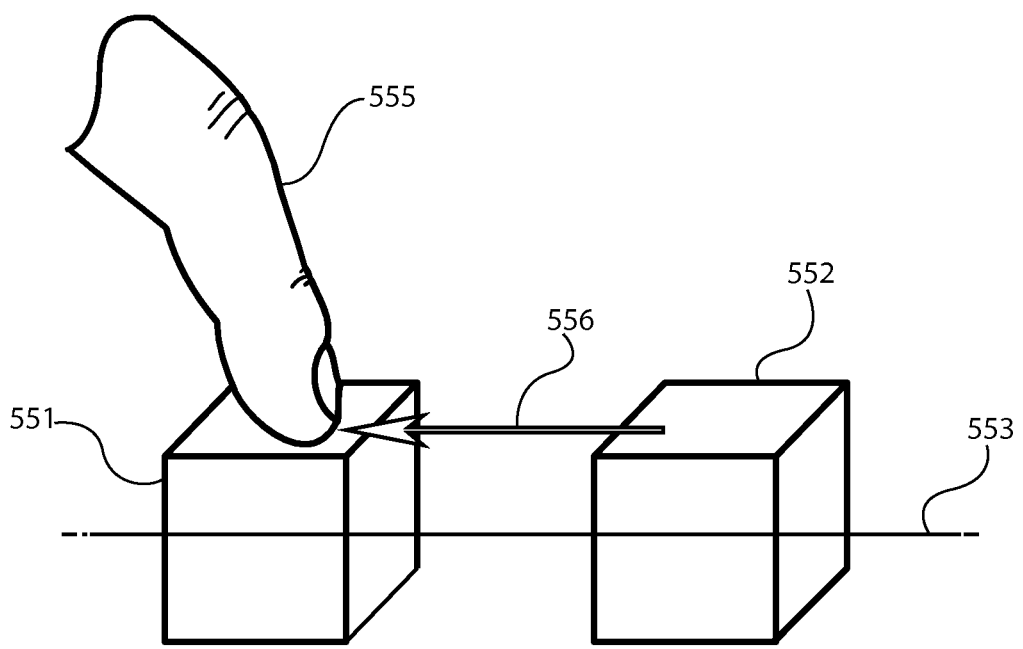

FIG. 5C is a diagram illustrating an input associated with a plurality of bead apparatuses according to at least one example embodiment. In at least one example embodiment, the input described by the example of FIG. 5C is a scroll input. It can be seen that bead apparatuses 551 and 552 are adjacent to each other as mounted on strand 553. It can be seen that finger 555 is performing touch input 556, which is performed upon both bead apparatus 551 and bead apparatus 552. In at least one example embodiment, bead apparatus 552 receives information indicative of touch input 556. In at least one example embodiment, apparatus 551 receives information indicative of input 556 in relation to bead apparatus 552. For example, bead apparatus 552 may provide information indicative of touch input 556 in relation to bead apparatus 552. In this manner, apparatus 551 may determine that touch input 556 spans across bead apparatuses 552 and 551. In at least one example embodiment, a bead apparatus performs an operation in relation to a touch input associated with the bead apparatus and performs a different operation in relation to a touch input that spans the bead apparatus and another bead apparatus. For example, the bead apparatus may send information indicative of a touch input associated with the bead apparatus to a separate apparatus, and may perform an operation in conjunction with the other bead apparatus in relation to a touch input that spans the bead apparatus and the other bead apparatus.

Figure 5D:
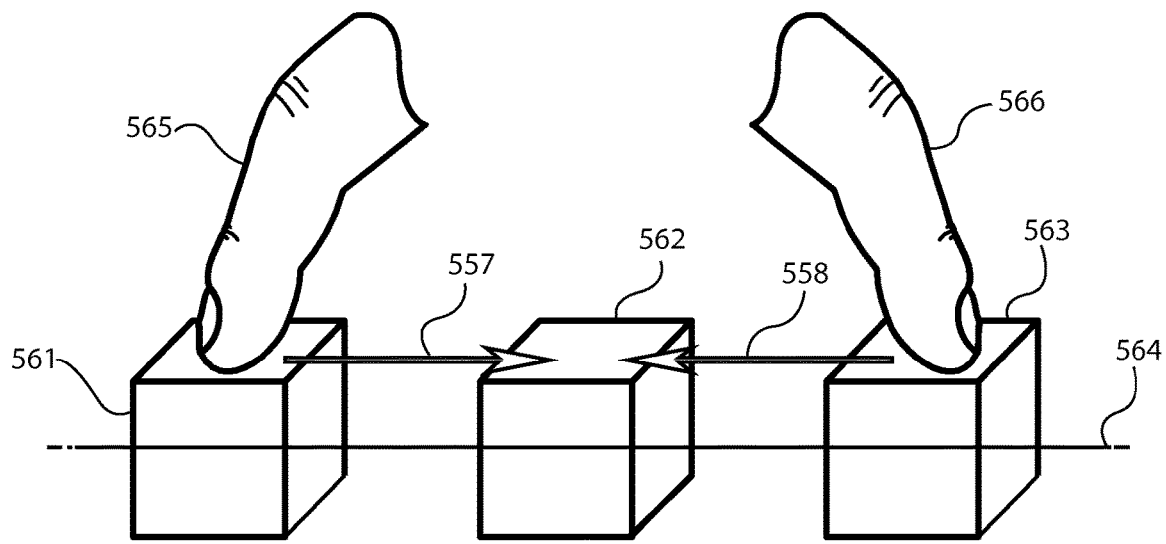

FIG. 5D is a diagram illustrating an input associated with a plurality of bead apparatuses according to at least one example embodiment. In at least one example embodiment, the input described by the example of FIG. 5D is a pinch input. It can be seen that bead apparatuses 561, 562, and 563 are adjacent to each other as mounted on strand 564. It can be seen that finger 565 and finger 566 are performing touch input 557 and touch input 558, respectively, which are performed upon bead apparatuses 561 and 562 and bead apparatuses 563 and 562, respectively.

In at least one example embodiment, bead apparatus 561 receives information indicative of touch input 557. In at least one example embodiment, apparatus 562 receives information indicative of input 557 in relation to bead apparatus 561. For example, bead apparatus 561 may provide information indicative of touch input 557 in relation to bead apparatus 561. In this manner, apparatus 562 may determine that touch input 557 spans across bead apparatuses 561 and 562. Similarly, in at least one example embodiment, bead apparatus 563 receives information indicative of touch input 558. In at least one example embodiment, apparatus 562 receives information indicative of input 558 in relation to bead apparatus 563. For example, bead apparatus 563 may provide information indicative of touch input 558 in relation to bead apparatus 563. In this manner, apparatus 562 may determine that touch input 558 spans across bead apparatuses 563 and 562.

In at least one example embodiment, a bead apparatus performs an operation in relation to at least one touch input associated with the bead apparatus and performs a different operation in relation to at least one touch input that spans the bead apparatus and another bead apparatus. For example, the bead apparatus may send information indicative of a touch input associated with the bead apparatus to a separate apparatus, and may perform an operation in conjunction with the other bead apparatus in relation to a touch input that spans the bead apparatus and the other bead apparatus.

Figure 6:
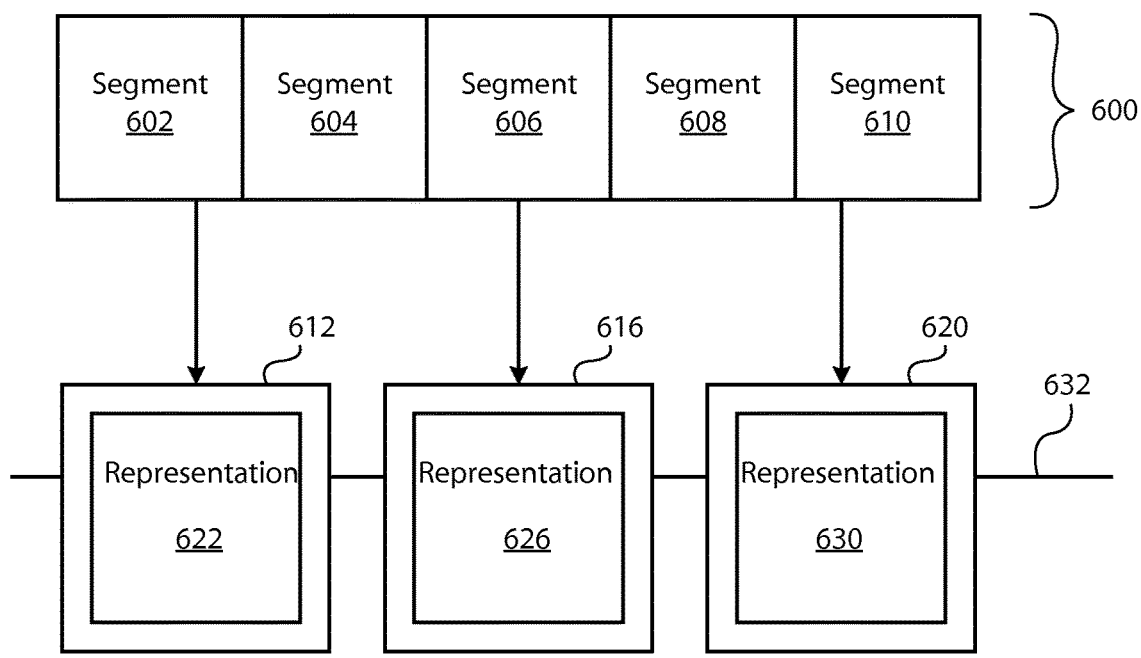
FIG. 6 is a diagram showing designation and display of a content item segment according to at least one example embodiment.

FIG. 6 is a diagram showing designation and display of a content item segment according to at least one example embodiment. The example of FIG. 6 is merely an example and does not limit the scope of the claims. For example, content item segment count may vary, bead apparatus count may vary, designation of content item segments may vary, and/or the like.

FIG. 6 is a diagram showing designation and display of a content item segment according to at least one example embodiment. In the example of FIG. 6, content item 600 is associated with segments 602, 604, 606, 608, and 610. Segments 602, 604, 606, 608, and 610 each relate to a content item segment associated with content item 600. Segments 602, 604, 606, 608, and 610 are each associated with a content item segment identifier. In the example of FIG. 6, bead 612, 616, and 620 relate to a bead apparatus associated with content item 600. Beads 612, 616, and 620 are physically connected via strand 632. In the example of FIG. 6, bead 612 is adjacent to bead 616, and bead 616 is adjacent to bead 620. In the example of FIG. 6, segment 602 is chronologically adjacent to segment 604, segment 604 is chronologically adjacent to segment 606, segment 606 is chronologically adjacent to segment 608, and segment 608 is chronologically adjacent to segment 610. In the example of FIG. 6, bead 612 is designated segment 602, bead 616 is designated segment 606, and bead 620 is designated segment 610. As shown, beads 612, 616, and 620 are designated segments such that no chronologically intermediate segment has been designated a bead. For example, segment 604 and 608 fail to have a bead apparatus designated. In the example of FIG. 6, representation 622 is a visual representation of the content item segment identifier associated with segment 602, representation 626 is a visual representation of the content item segment identifier associated with segment 606, and representation 630 is a visual representation of the content item segment identifier associated with segment 610. In the example of FIG. 6, bead 612 displays representation 622, bead 616 displays representation 626, and bead 620 displays representation 630.

In some circumstances, it may be desirable to utilize multiple bead apparatuses in conjunction with one another in a way that allows for the collective display of content. For example, a user may desire to display and/or interact with content by way of multiple displays associated with multiple bead apparatuses. In at least one example embodiment, an apparatus receives information associated with a content item. Receipt of the content item may, for example, relate to receipt of the content item from at least one memory, from a separate apparatus, and/or the like. In at least one example embodiment, a content item is associated with one or more content item segments. A content item segment may, for example, relate to a portion of the content item, a part of the content item, a component of the content item, a region of the content item, and/or the like. In at least one example embodiment, a content item segment is identified by way of a content item segment identifier associated with the content item segment. A content item segment identifier may facilitate identification of the content item segment by the apparatus, facilitate identification of the content item segment by the user, facilitate location of the content item segment within the content item, and/or the like. In at least one example embodiment, a content item segment identifier is associated with a visual representation of the content item segment identifier. The visual representation of the content item segment identifier may, for example, relate to a representation of the content item segment identifier used to facilitate identification of the content item segment by a user of the apparatus. For example, the visual representation of the content item segment identifier may, for example, relate to a graphical representation, a textual representation, an auditory representation, and/or the like.

In at least one example embodiment, the content item comprises video content and the content item segment is a scene associated with the video content. For example, the video content may comprise at least one predetermined scene, may be determined to comprise at least one scene, and/or the like. The content item segment identifier associated with the scene may, for example, relate to a keyframe identifying the scene, a position indicator, a scene identifier identifying the scene, and/or the like. The representation of the content item segment identifier may, for example, relate to a thumbnail image, a visual representation of the scene, metadata associated with the scene, and/or the like.

In at least one example embodiment, the content item comprises audio content and the content item segment is a song associated with the audio content. For example, the audio content may comprise at least one predetermined song, may be determined to comprise at least one song, and/or the like. The content item segment identifier associated with the song may, for example, relate to a title, a position indicator, a song identifier identifying the song, and/or the like. The representation of the content item segment identifier may, for example, relate to a thumbnail image, an album cover, metadata associated with the song, and/or the like.

In one or more example embodiments, the content item comprises document content and the content item segment is a chapter associated with the document content. For example, the document content may comprise at least one predetermined chapter, may be determined to comprise at least one chapter, and/or the like. In such an example, the chapter may be a delineation of the document, a sub-part of the document, a position within the document, and/or the like. The content item segment identifier associated with the chapter may, for example, relate to a title, a subtitle, a position indicator, a chapter identifier identifying the chapter, and/or the like. The representation of the content item segment identifier may, for example, relate to a thumbnail image, a visual representation of the chapter, a textual representation of the chapter, metadata associated with the chapter, and/or the like.

In at least one example embodiment, the content item comprises document content and the content item segment is a bookmark associated with the document content. For example, the document content may comprise at least one predetermined bookmark, may be determined to comprise at least one bookmark, and/or the like. In such an example, the bookmark may be a delineation of the document, a sub-part of the document, a position within the document, and/or the like. The content item segment identifier associated with the bookmark may, for example, relate to a title, a subtitle, a position indicator, a bookmark identifier identifying the bookmark, and/or the like. The representation of the content item segment identifier may, for example, relate to a thumbnail image, a visual representation of the bookmark, a textual representation of the bookmark, metadata associated with the bookmark, and/or the like.

In one or more example embodiments, the content item comprises website content and the content item segment is a webpage associated with the website content. For example, the website content may comprise at least one predetermined webpage, may be determined to comprise at least one webpage, and/or the like. In such an example, the webpage may be an article associated with the website, a sub-part of the website, a position within the website, a uniform resource locator address associated with the website, and/or the like. The content item segment identifier associated with the webpage may, for example, relate to a title, a uniform resource locator address, a webpage identifier identifying the webpage, and/or the like. The representation of the content item segment identifier may, for example, relate to a thumbnail image representative of the webpage, a visual representation of the webpage, a textual representation of the webpage, metadata associated with the webpage, and/or the like.

In at least one example embodiment, the content item comprises browser history content and the content item segment is a webpage associated with the browser history content. For example, the browser history content comprise a chronological record of visited webpages, websites, and/or the like. The content item segment identifier associated with the webpage may, for example, relate to a title, a uniform resource locator address, a webpage identifier identifying the webpage, and/or the like. The representation of the content item segment identifier may, for example, relate to a thumbnail image representative of the webpage, a visual representation of the webpage, a textual representation of the webpage, metadata associated with the webpage, and/or the like.

In some circumstances, it may be desirable to allow for receipt of various types of information associated with a content item. For example, a user may desire to display and/or interact with various types of content, regardless of the format of such content. In such an example, it may be desirable for an apparatus to be configured to fill in and/or determine additional information associated with the content item in order to facilitate display and/or interaction with the content item. In at least one example embodiment, the received information associated with the content item comprises information indicative of the content item. For example, the apparatus may receive information indicative of the content item itself and may not receive additional information indicative of a content item segment, a content item segment identifier, and/or a visual representation of the content item segment identifier. In such an example, the apparatus may determine a content item segment of the content item based, at least in part, on the content item. The apparatus may, for example, determine a content item segment identifier identifying the content item segment based, at least in part, on the content item segment. The apparatus may, for example, determine a visual representation of a content item segment identifier based, at least in part, on the content item segment identifier.

In at least one example embodiment, the information associated with the content item comprises information indicative of the content item and information indicative of a content item segment. In such an example, the apparatus may avoid determination of the content item segment based, at least in part, on the received information indicative of the content item segment. The apparatus may, for example, determine a content item segment identifier identifying the content item segment based, at least in part, on the content item segment. The apparatus may, for example, determine a visual representation of the content item segment identifier based, at least in part, on the content item segment identifier.

In one or more example embodiments, the information associated with a content item comprises information indicative of the content item, information indicative of at least one content item segment, and information indicative of at least one content item segment identifier. In such an example, the apparatus may avoid determination of the content item segment and the content item segment identifier based, at least in part, on the received information indicative of the content item segment and the received information indicative of the content item segment identifier, respectively. In such an example, the apparatus may determine a visual representation of the content item segment identifier based, at least in part, on the content item segment identifier.

In at least one example embodiment, the information associated with a content item comprises information indicative of the content item, information indicative of at least one content item segment, information indicative of at least one content item segment identifier, and information indicative of at least one visual representation associated with the one or more content item segment identifiers. In such an example, the apparatus may avoid determination of additional information associated with the content item based, at least in part, on the received information associated with the content item.

In order to facilitate display of and/or interaction with a content item by way of two or more bead apparatuses, it may be desirable to designate at least one content item segment associated with the content item based, at least in part, on a number of bead apparatuses, a bead apparatus arrangement, and/or the like. In at least one example embodiment, a first bead apparatus may be designated to be associated with a first content item segment of the content item. In such an example, the first content item segment may be identified by a first content item segment identifier. For example, as illustrated in FIG. 6, segment 602 may be identified by a content segment identifier associated with representation 622. Similarly, a second bead apparatus may be designated to be associated with a second content item segment of the content item. The second content item segment may, for example, be identified by a second content item segment identifier. For example, as illustrated in FIG. 6, segment 606 may be identified by a content segment identifier associated with representation 626.

In at least one example embodiment, designation of a first bead apparatus to be associated with a first content item segment of the content item and designation of a second bead apparatus to be associated with a second content item segment of the content item may be based, at least in part, on a spatial relationship between the first bead apparatus and the second bead apparatus. The spatial relationship may, for example, relate to adjacency of the first bead apparatus and the second bead apparatus, such that no content item segment that is chronologically between the first content item segment and the second content item segment is associated with another bead apparatus. For example, a content item may be associated with at least three content item segments. In such an example, the first content item segment may be a content item segment occurring first chronologically, the second content item segment may be a content item segment occurring chronologically between the first content item segment and the third content item segment, and the third content item segment may be a content item segment occurring last chronologically. As such, the first bead apparatus, directly adjacent to the second bead apparatus, may be designated the first content item segment and the second bead apparatus may be designated the second content item segment. In the example of FIG. 6, segment 602 may be associated with bead 612 and segment 604 may be associated with bead 616. In such an example, there fails to be a content item segment that occurs between segment 602 and segment 604. Alternatively, in such an example, the first bead apparatus may be designated the second content item segment and the second bead apparatus may be designated the third content item segment. In another example, the first bead apparatus may be designated the first content item segment and the second bead apparatus may be designated the third content item segment. In such an example, the second content item segment may be precluded from designation to the first bead apparatus, the second bead apparatus, and/or any additional associated bead apparatuses. In the example of FIG. 6, segment 602 may be associated with bead 612 and segment 606 may be associated with bead 616. In such an example, segment 604 occurs chronologically between segment 602 and segment 606, and is precluded from designation to another bead apparatus.

In at least one example embodiment, the spatial relationship relates to adjacency of the first bead apparatus and the second bead apparatus, and the first content item segment may be adjacent to the second content item segment within the content item. Such adjacency between the first content item segment and the second content item segment may, for example, relate to chronological adjacency. For example, segment 602 of FIG. 6 and segment 604 of FIG. 6 are chronologically adjacent content item segments. In one or more example embodiments, the spatial relationship relates to adjacency of the first bead apparatus and the second bead apparatus, and the first content item segment may be separated from the second content item segment within the content item, by a predetermined content item segment interval. In such an example, the content item segments falling within the predetermined content item segment interval may be precluded from designation to a bead apparatus. The predetermined content item segment interval may, for example, relate to a predetermined number of content item segments failing to be associated with a bead apparatus between each content item segment associated with a bead apparatus. For example, segments 602, 606, and 610 of FIG. 6 are associated with beads 612, 616, and 620, respectively. In such an example, a predetermined content item segment interval may indicate associating every other content item segment such that every other content item segment is precluded from association with a bead apparatus.

In order to facilitate display of and/or interaction with a content item by way of two or more bead apparatuses, it may be desirable to display a content item segment associated with the content item in such a manner that enables a user to quickly and easily identify the content item segments. In some circumstances, for example, a content item segment may be identified to the apparatus by a content item segment identifier that is not conducive to identification and/or recognition by a user of the apparatus. In such an example, it may be desirable to display a representation of the content item segment identifier such that the representation better facilitates identification of the content item segment by the user. In at least one example embodiment, a visual representation of a first content item segment identifier may be caused to be displayed by a first bead apparatus. Similarly, a visual representation of a second content item segment identifier may be caused to be displayed by a second bead apparatus. For example, a content item may comprise video content. In such an example, the video content may be associated with at least two scenes, each scene relating to a content item segment. In order to facilitate display of the scenes by the bead apparatuses, each scene may be associated with a keyframe identifying the respective scene, a position indicator, a scene identifier identifying the scene, and/or the like. The representation of the content item segment identifier associated with the scene may, for example, relate to a thumbnail image, a visual representation of the scene, metadata associated with the scene, and/or the like. For example, the first bead apparatus associated with the first content item segment may be caused to display a visual representation of a keyframe associated with the first content item segment. For example, the first bead apparatus may display a still image associated with the keyframe.

In some circumstances, it may be desirable to allow a user to interact with content displayed on one or more bead apparatuses. For example, a user may desire to select a specific content item segment by way of the associated bead apparatus, and, subsequently, manipulate, edit, modify, transmit, and/or display information associated with the selected content item segment, as may be described regarding FIGS. 7A-7B. In at least one example embodiment, an apparatus receives information indicative of a selection input associated with a bead apparatus. The selection input may, for example, relate to a tap input associated with the second bead apparatus, a rotation input associated with the second bead apparatus, and/or the like, as may be described regarding FIGS. 5A-5D.

In some circumstances, it may be desirable to allow for re-designation of a bead apparatus. For example, it may be desirable for a bead apparatus to display a visual representation associated with a content item segment and, subsequent, display a different visual representation associated with a different content item segment. For example, based, at least in part, on a chronological display of a stream of information associated with a content item, a display of a bead apparatus may be caused to be updated such that the displayed visual representation correlates with a chronologically current content item segment of a content item. In at least one example embodiment, the apparatus designates the second bead apparatus to be associated with a third content item segment of the content item. The third content item segment may, for example, be identified by a third content item segment identifier. In one or more example embodiments, the apparatus causes display of a visual representation of the third content item segment identifier by the second bead apparatus. In such an example, the display of the visual representation of the third content item segment identifier by the second bead apparatus may comprise termination of display of a different visual representation of a different content item segment identifier by the second bead apparatus and subsequent display of the visual representation of the third content item segment identifier by the second bead apparatus.

In some circumstances, a content item may be associated with a number of content item segments that exceeds a number of associated bead apparatuses. For example, a content item may be associated with ten content item segments. In such an example, the content item may further be associated with three bead apparatuses. As such, in such an example, it may be desirable to allow a user to scroll through and selectively display a subset of visual representations of content item segment identifiers associated with a corresponding subset of content item segments. In at least one example embodiment, a first bead apparatus, a second bead apparatus, and a third bead apparatus are configured such that the first bead apparatus is adjacent to the second bead apparatus and the second bead apparatus is adjacent to the third bead apparatus. In such an example, the first bead apparatus is designated a first content item segment and the first bead apparatus is caused to display a visual representation of a first content item segment identifier associated with the first content item. Similarly, the second bead apparatus is designated a second content item segment and the second bead apparatus is caused to display a visual representation of a second content item segment identifier associated with the second content item, and the third bead apparatus is designated a third content item segment and the third bead apparatus is caused to display a visual representation of a third content item segment identifier associated with the third content item. In such an example embodiment, the apparatus may receive information indicative of a scroll input associated with at least one of the first bead apparatus, the second bead apparatus, or the third bead apparatus. Based, at least in part, on the received scroll input, the first bead apparatus, the second bead apparatus, and/or the third bead apparatus may be caused to change chronologically through display of adjacent content item segments associated with a content item. In at least one example embodiment, based, at least in part, on a received scroll input, an apparatus may cause designation of the first bead apparatus to be associated with the second content item segment of the content item, the second content item segment being identified by the second content item segment identifier. The apparatus may, additionally, cause display of a visual representation of the second content item segment identifier by the first bead apparatus. Similarly, in at least one example embodiment, the apparatus may cause designation of the second bead apparatus to be associated with the third content item segment of the content item based, at least in part, on the received scroll input. The third content item segment may, for example, be identified by the third content item segment identifier. The apparatus may, further, cause display of a visual representation of the third content item segment identifier by the second bead apparatus. Likewise, in one or more example embodiments, the apparatus may cause designation of the third bead apparatus to be associated with a fourth content item segment of the content item, the fourth content item segment being identified by a fourth content item segment identifier. The apparatus may, moreover, cause display of a visual representation of the fourth content item segment identifier by the third bead apparatus. Restated, and without limitation, the apparatus may shift designation of adjacent content item segments and associated display of visual representations of content item segment identifiers associated with the adjacent content item segments down one or more adjacent bead apparatuses. In such an example, in order to facilitate designation and display of the fourth content item segment, the apparatus may be configured to receive additional information associated with the content item. The additional information may, for example, be information indicative of the fourth content item segment, a fourth content item segment identifier, a visual representation of the fourth content item segment identifier, and/or the like. The additional information may, for example, be received from at least one of memory, a separate apparatus, and/or the like. The separate apparatus may, for example, relate to a bead apparatus, an electronic apparatus, a server, a computer, a laptop, a television, a phone, and/or the like.

In the example of FIG. 6, each of beads 612, 616, and 620 may receive information indicative of a scroll input associated with the respective bead apparatus. Based, at least in part, on the scroll input, representations 622, 626, and/or 630 may be caused to shift with respect to beads 612, 616, and/or 620. For example, bead 620 and/or bead 616 may receive indication of a scroll input associated with bead 620 and/or bead 616. In such an example, bead 612 may be designated segment 606 and display representation 626, bead 616 may be designated segment 610 and display representation 630, bead 620 may be designated a different content item segment associated with the content item and display a different visual representation of a different content item segment identifier associated with the different content item segment.

Figure 7A:
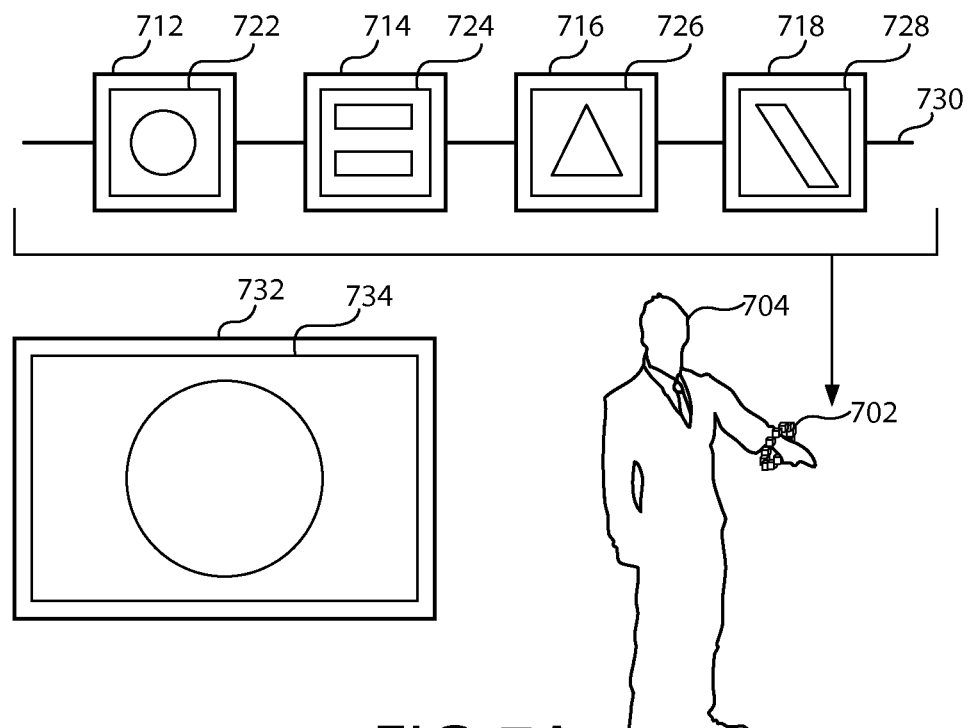
FIG. 7A-7B are illustrations showing apparatus use according to at least one example embodiment.
Figure 7B:
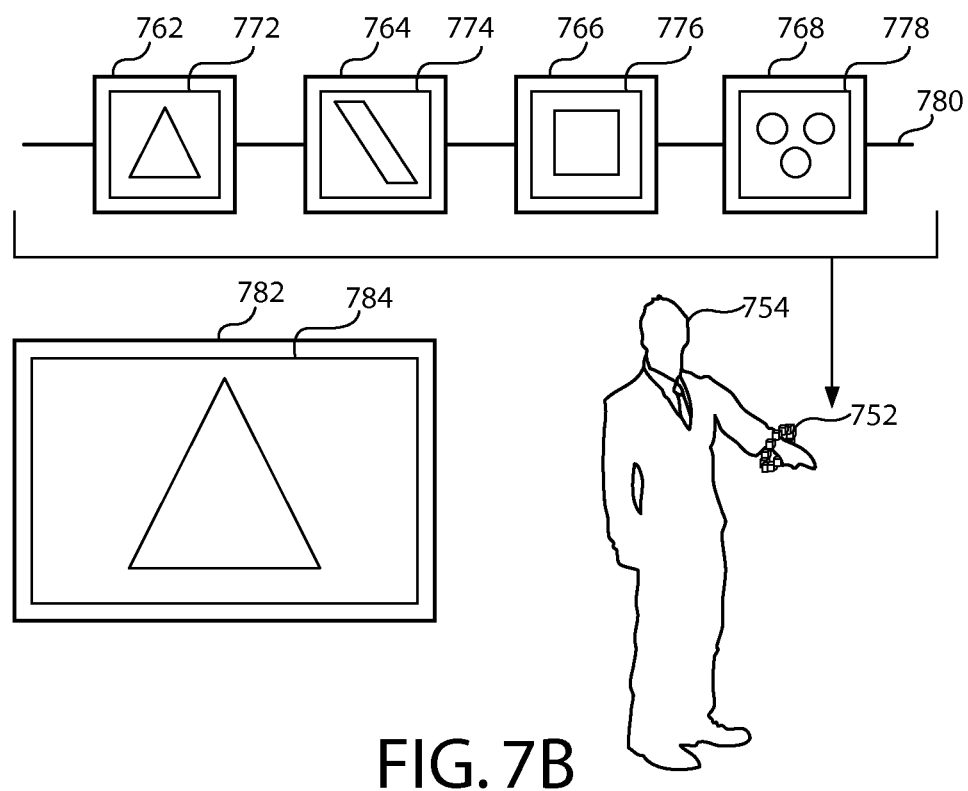

FIGS. 7A-7B are illustrations showing apparatus use according to at least one example embodiment. The examples of FIGS. 7A-7B are merely examples and do not limit the scope of the claims. For example, bead apparatus count, shape, size, and/or design may vary, content item segments may vary, visual representations may vary, rendering of the content item segment may vary, and/or the like.

In some circumstances, it may be desirable to allow a bead apparatus to cause display of content on a separate display. For example, a bead apparatus may comprise a small display. In some circumstances, a user may desire to display content on a larger display in order to present the content to others, to further interact with the content, and/or the like. In at least one example embodiment, an apparatus causes rendering of a content item segment based, at least in part, on a selection input. For example, a bead apparatus may receive indication of a selection input associated with the bead apparatus. In such an example, the bead apparatus may be associated with a content item segment of a content item. Based, at least in part, on the selection input, the bead apparatus may cause rendering of the content item segment. Causation of rendering may, for example, relate to rendering of the content item segment. In one or more example embodiments, causation of rendering comprises sending information indicative of a content item segment to a separate apparatus, causing sending of information indicative of a content item segment by another apparatus to a separate apparatus, and/or the like. In such an example, the other apparatus may be a bead apparatus, an electronic apparatus, a server, a computer, a laptop, a television, a phone, and/or the like. Information indicative of the second content item segment may, for example, relate to a rendering directive. In at least one example embodiment, a rendering directive comprises instructions to cause rendering of information associated with a content item segment, information associated with rendering of the content item segment, and/or the like.

In at least one example embodiment, a content item segment is a content item segment that is being rendered. For example, a bead apparatus may be designated a content item segment. The content item segment may, for example, be associated with a content item segment identifier. The content item segment may, for example, relate to a content item segment currently caused to be rendered by a separate apparatus. In such an example, the separate apparatus may be a television, a monitor, a projector, an electronic apparatus, a display apparatus, and/or the like.

In some circumstances, it may be desirable to shift designation and/or display of content item segments and/or content item segment identifiers based, at least in part, on determining what content item segment is currently being caused to be displayed by a separate apparatus. In one or more example embodiments, an apparatus determines that a content item segment being rendered is the content item segment. In such an example, the apparatus may receive information indicative of a current rendering position of the content item corresponding with the content item segment. In at least one example embodiment, determination that the content item segment that is being rendered is the content item segment is based, at least in part, on the information indicative of the current rendering position of the content item corresponding with the content item segment. In such circumstances, it may be beneficial to cause re-designation of content item segments such that the one or more associated bead apparatuses display a stream of content item segments. In at least one example embodiment, a first bead apparatus may be designated to be associated with a content item segment of the content item based, at least in part, on a determination that a content item segment that is being rendered is the content item segment. In such an example embodiment, the content item segment may be identified by a content item segment identifier. For example, the apparatus may cause display of a visual representation of the content item segment identifier by the bead apparatus based, at least in part, on the rendering and/or the re-designation. Similarly, in at least one example embodiment, another bead apparatus may be designated to be associated with another content item segment of the content item, based, at least in part, on the bead apparatus being associated with the content item segment. The apparatus may cause display of a visual representation of the other content item segment identifier by the other bead apparatus based, at least in part, on the rendering and/or the re-designation.

FIG. 7A is an illustration showing apparatus use according to at least one example embodiment. In the example of FIG. 7A, apparatus 702 comprises a collection of beads 712, 714, 716, and 718, connected and configured as a bracelet via strand 730. In the example of FIG. 7A, user 704 wears apparatus 702 around the user's wrist. In the example of FIG. 7A, bead 712 is associated with a content item segment and bead 712 displays representation 722. Representation 722 is a visual representation of the content item segment identifier associated with the content item segment and relates to an image of a circle. In the example of FIG. 7A, bead 714 is associated with a content item segment and bead 714 displays representation 724. Representation 724 is a visual representation of the content item segment identifier associated with the content item segment and is an image of two parallel lines. In the example of FIG. 7A, bead 716 is associated with a content item segment and bead 716 displays representation 726. Representation 726 is a visual representation of the content item segment identifier associated with the content item segment and is an image of a triangle. In the example of FIG. 7A, bead 718 is associated with a content item segment and bead 718 displays representation 728. Representation 728 is a visual representation of the content item segment identifier associated with the content item segment and is an image of a slanted line.

In the example of FIG. 7A, apparatus 732 is a separate apparatus. For example, apparatus 732 is a television, a monitor, a projector, an electronic apparatus, a display apparatus, and/or the like. In the example of FIG. 7A, apparatus 732 is rendering an image of a circle, similar to representation 722 displayed by bead 712. In the example of FIG. 7A, said rendering of the image of a circle may be based, at least in part, on a receipt of a selection input associated with bead 712, communication of a rendering directive to apparatus 732, and/or the like. In the example of FIG. 7A, apparatus 732 may be caused to render the image of two parallel lines based, at least in part, on a selection input, a scroll input, a rendering directive, and/or the like. Although the example of FIG. 7A illustrates display of geometric shapes, any type of content item may be designated, displayed, and/or rendered, similar as may be described regarding FIG. 6.

FIG. 7B is an illustration showing apparatus use according to at least one example embodiment. In the example of FIG. 7B, apparatus 752 comprises a collection of beads 762, 764, 766, and 768, connected and configured as a bracelet via strand 780. In the example of FIG. 7B, user 754 wears apparatus 752 around the user's wrist. In the example of FIG. 7B, bead 762 is associated with a content item segment and bead 762 displays representation 772. Representation 772 is a visual representation of the content item segment identifier associated with the content item segment and is an image of a triangle. In the example of FIG. 7B, representation 772 corresponds to representation 726 of FIG. 7A. In the example of FIG. 7B, bead 764 is associated with a content item segment and bead 764 displays representation 774. Representation 774 is a visual representation of the content item segment identifier associated with the content item segment and is an image of a slanted line. In the example of FIG. 7B, representation 774 corresponds to representation 728 of FIG. 7A. In the example of FIG. 7B, bead 766 is associated with a content item segment and bead 766 displays representation 776. Representation 776 is a visual representation of the content item segment identifier associated with the content item segment and is an image of a square. In the example of FIG. 7B, representation 776 is a visual representation associated with a content item segment chronologically adjacent to representation 728 of FIG. 7A, such that no chronologically intermediate content item segment is designated and/or displayed by a bead apparatus. In the example of FIG. 7B, bead 768 is associated with a content item segment and bead 768 displays representation 778. Representation 778 is a visual representation of the content item segment identifier associated with the content item segment and is an image of three dots.

In the example of FIG. 7B, apparatus 782 is a separate apparatus. For example, apparatus 782 is a television, a monitor, a projector, an electronic apparatus, a display apparatus, and/or the like. In the example of FIG. 7B, apparatus 782 is rendering an image of a triangle, similar to representation 772 displayed by bead 762. In the example of FIG. 7B, said rendering of the image of a triangle may be based, at least in part, on receipt of a selection input associated with bead 772, receipt of a selection input associated with bead 716 of FIG. 7A, communication of a rendering directive to apparatus 782, and/or the like. In the example of FIG. 7B, apparatus 782 may be caused to render the image of a triangle based, at least in part, on a selection input, a scroll input, a rendering directive, and/or the like. Although the example of FIG. 7B illustrates display of geometric shapes, any type of content item may be designated, displayed, and/or rendered, similar as may be described regarding FIG. 6.

Figure 8:
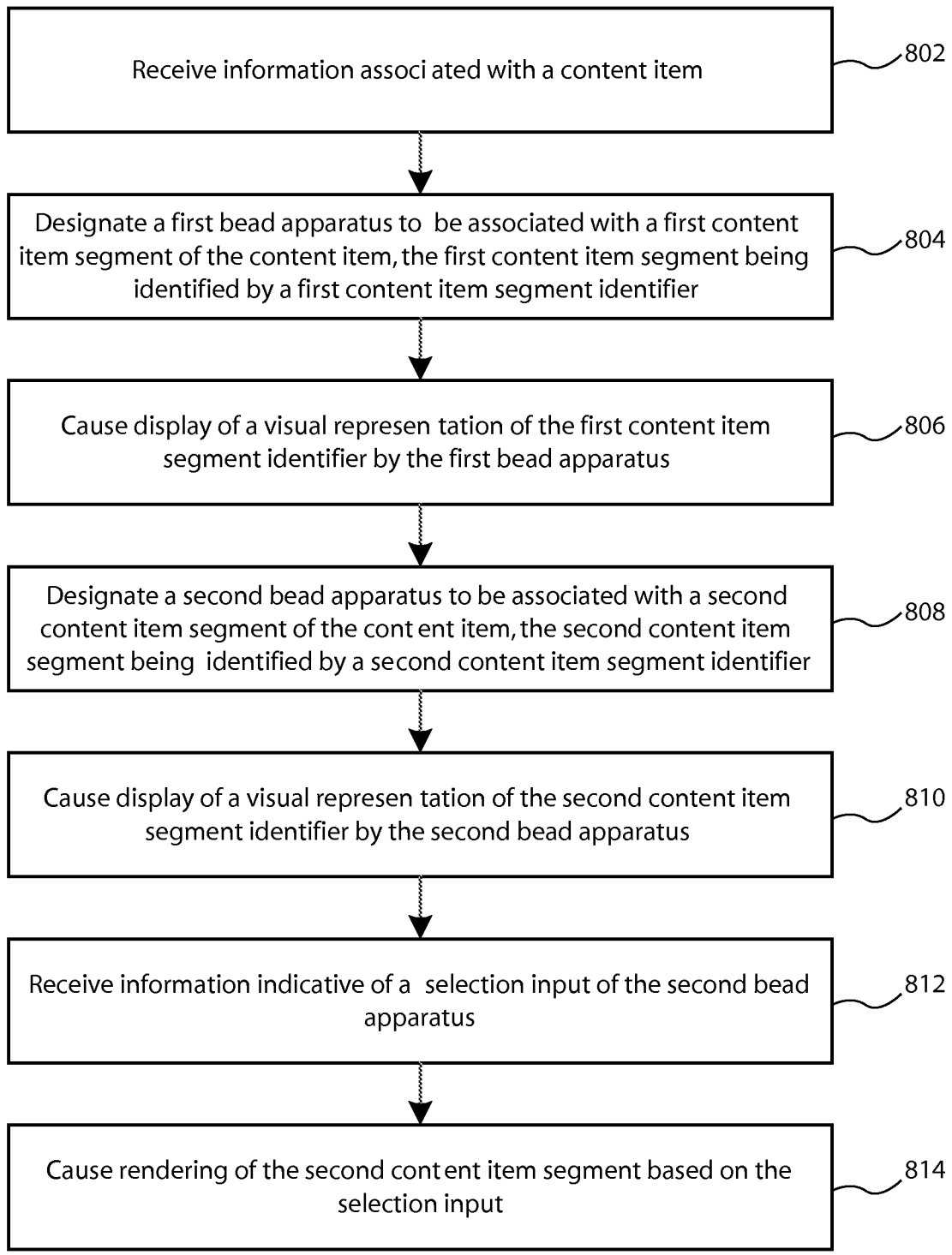
FIG. 8 is a flow diagram illustrating activities associated with causing rendering of a content item segment according to at least one example embodiment.

FIG. 8 is a flow diagram illustrating activities associated with causing rendering of a content item segment according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

At block 802, the apparatus receives information associated with a content item. The receipt, the information, and the content item may be similar as described regarding FIGS. 2A-2B, FIG. 3, and FIG. 6.

At block 804, the apparatus designates a first bead apparatus to be associated with a first content item segment of the content item, the first content item segment being identified by a first content item segment identifier. The designation, the first bead apparatus, the first content item segment, the association, and the first content item segment identifier may be similar as described regarding FIG. 6.

At block 806, the apparatus causes display of a visual representation of the first content item segment identifier by the first bead apparatus. The causation of display and the visual representation of the first content item segment identifier may be similar as described regarding FIG. 6.

At block 808, the apparatus designates a second bead apparatus to be associated with a second content item segment of the content item, the second content item segment being identified by a second content item segment identifier. The designation, the second bead apparatus, the second content item segment, the association, and the second content item segment identifier may be similar as described regarding FIG. 6.

At block 810, the apparatus causes display of a visual representation of the second content item segment identifier by the second bead apparatus. The causation of display and the visual representation of the second content item segment identifier may be similar as described regarding FIG. 6.

At block 812, the apparatus receives information indicative of a selection input of the second bead apparatus. The receipt of information and the selection input may be similar as described regarding FIGS. 5A-5D and FIGS. 7A-7B.

At block 814, the apparatus causes rendering of the second content item segment based, at least in part, on the selection input. The causation of rendering of the second content item may be similar as described regarding FIGS. 7A-7B.

Figure 9:
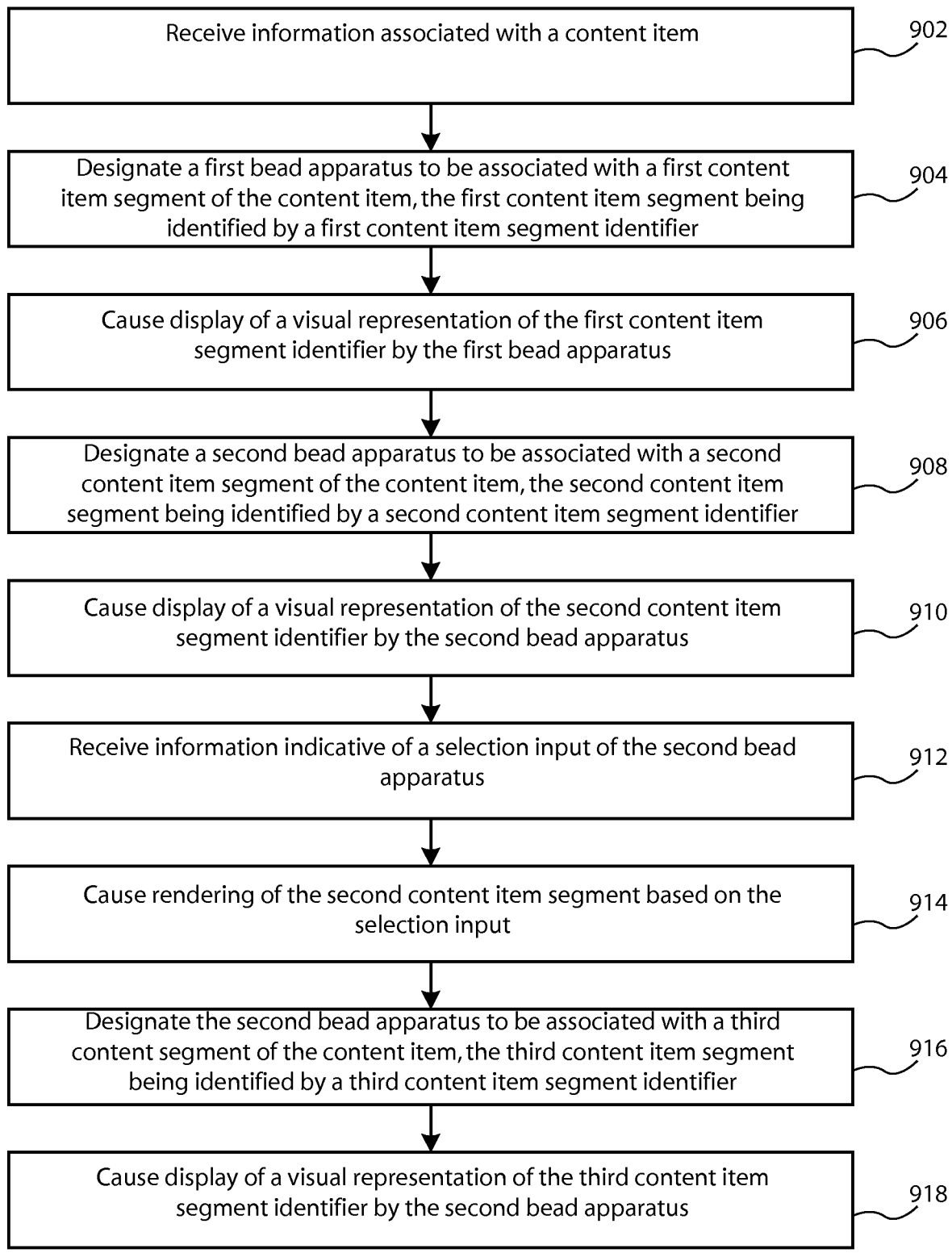
FIG. 9 is a flow diagram illustrating activities associated with causing rendering of a content item segment according to at least one example embodiment.

FIG. 9 is a flow diagram illustrating activities associated with causing rendering of a content item segment according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

At block 902, the apparatus receives information associated with a content item, similar as described regarding block 802 of FIG. 8.

At block 904, the apparatus designates a first bead apparatus to be associated with a first content item segment of the content item, the first content item segment being identified by a first content item segment identifier, similar as described regarding block 804 of FIG. 8.

At block 906, the apparatus causes display of a visual representation of the first content item segment identifier by the first bead apparatus, similar as described regarding block 806 of FIG. 8.

At block 908, the apparatus designates a second bead apparatus to be associated with a second content item segment of the content item, the second content item segment being identified by a second content item segment identifier, similar as described regarding block 808 of FIG. 8.

At block 910, the apparatus causes display of a visual representation of the second content item segment identifier by the second bead apparatus, similar as described regarding block 810 of FIG. 8.

At block 912, the apparatus receives information indicative of a selection input of the second bead apparatus, similar as described regarding block 812 of FIG. 8.

At block 914, the apparatus causes rendering of the second content item segment based, at least in part, on the selection input, similar as described regarding block 814 of FIG. 8.

At block 916, the apparatus designates the second bead apparatus to be associated with a third content item segment of the content item, the third content item segment being identified by a third content item segment identifier. The designation, the third content item segment, and the third content item segment identifier may be similar as described regarding FIG. 6 and FIGS. 7A-7B.

At block 918, the apparatus causes display of a visual representation of the third content item segment identifier by the second bead apparatus. The causation of display and the visual representation of the third content item segment identifier may be similar as described regarding FIG. 6 and FIGS. 7A-7B.

Figures 1, 10:
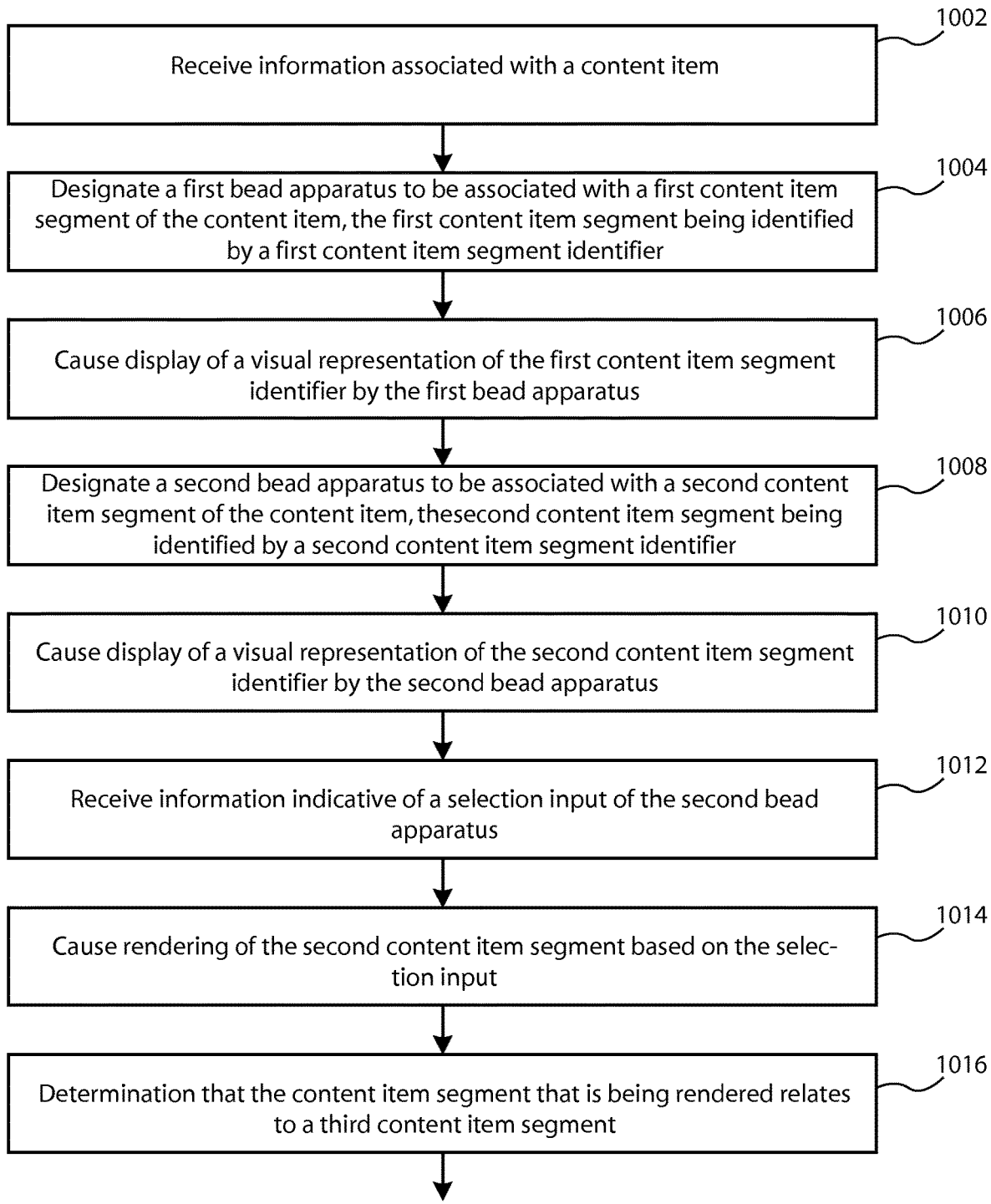
FIG. 10 is a flow diagram illustrating activities associated with causing rendering of a content item segment according to at least one example embodiment.
Figures 2, 10:
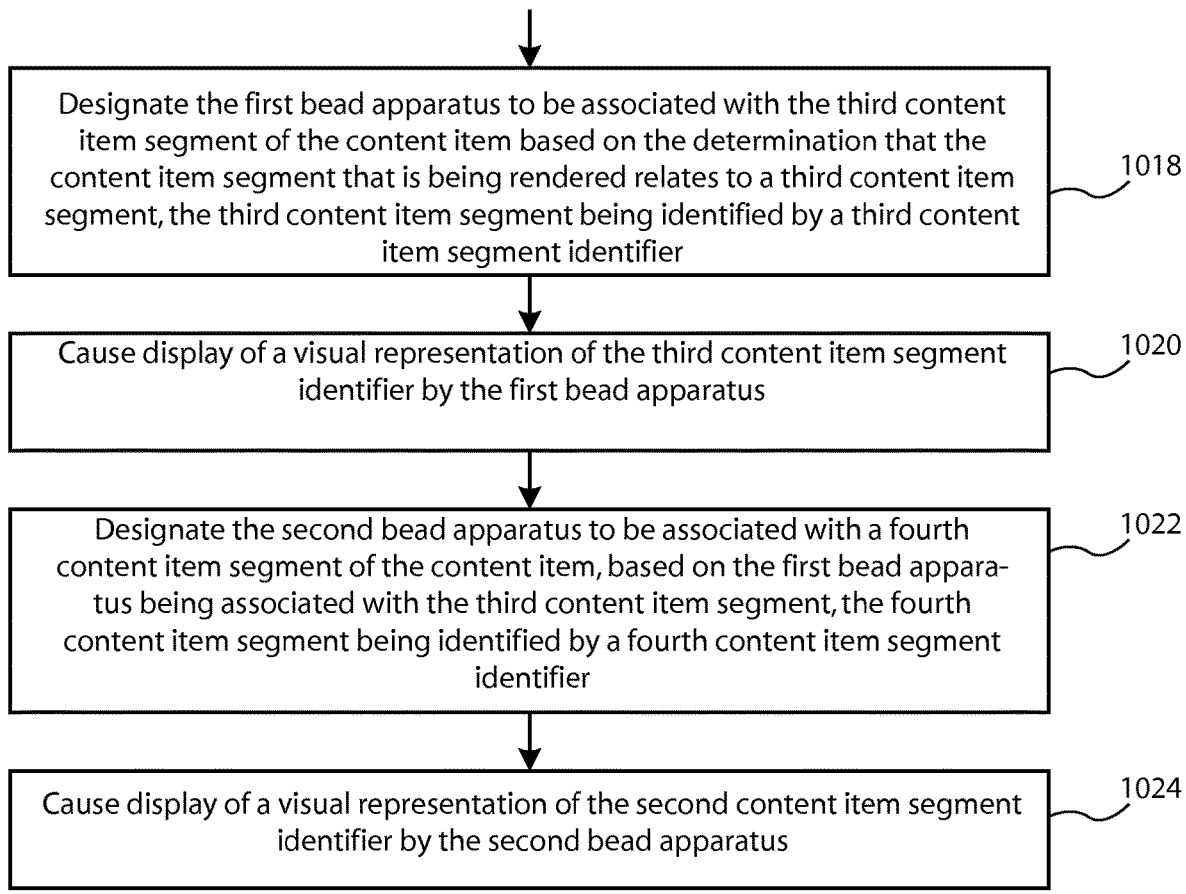

FIG. 10 is a flow diagram illustrating activities associated with causing rendering of a content item segment according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

At block 1002, the apparatus receives information associated with a content item, similar as described regarding block 802 of FIG. 8.

At block 1004, the apparatus designates a first bead apparatus to be associated with a first content item segment of the content item, the first content item segment being identified by a first content item segment identifier, similar as described regarding block 804 of FIG. 8.

At block 1006, the apparatus causes display of a visual representation of the first content item segment identifier by the first bead apparatus, similar as described regarding block 806 of FIG. 8.

At block 1008, the apparatus designates a second bead apparatus to be associated with a second content item segment of the content item, the second content item segment being identified by a second content item segment identifier, similar as described regarding block 808 of FIG. 8.

At block 1010, the apparatus causes display of a visual representation of the second content item segment identifier by the second bead apparatus, similar as described regarding block 810 of FIG. 8.

At block 1012, the apparatus receives information indicative of a selection input of the second bead apparatus, similar as described regarding block 812 of FIG. 8.

At block 1014, the apparatus causes rendering of the second content item segment based, at least in part, on the selection input, similar as described regarding block 814 of FIG. 8.

At block 1016, the apparatus determines that the content item segment that is being rendered is a third content item segment. The determination and the third content item segment may be similar as described regarding FIGS. 7A-7B.

At block 1018, the apparatus designates the first bead apparatus to be associated with the third content item segment of the content item based, at least in part, on the determination that the content item segment that is being rendered is the third content item segment, the third content item segment being identified by a third content item segment identifier. The designation, the third content item segment, the third content item segment identifier, and the rendering may be similar as described regarding FIG. 6 and FIGS. 7A-7B.

At block 1020, the apparatus causes display of a visual representation of the third content item segment identifier by the first bead apparatus. The causation of display and the visual representation of the third content item segment identifier may be similar as described regarding FIG. 6.

At block 1022, the apparatus designates the second bead apparatus to be associated with a fourth content item segment of the content item, based, at least in part, on the first bead apparatus being associated with the third content item segment, the fourth content item segment being identified by a fourth content item segment identifier. The designation, the fourth content item segment, the fourth content item segment identifier, and the rendering may be similar as described regarding FIG. 6 and FIGS. 7A-7B.

At block 1024, the apparatus causes display of a visual representation of the second content item segment identifier by the second bead apparatus. The causation of display and the visual representation of the second content item segment identifier may be similar as described regarding FIG. 6.

Figures 1, 11:
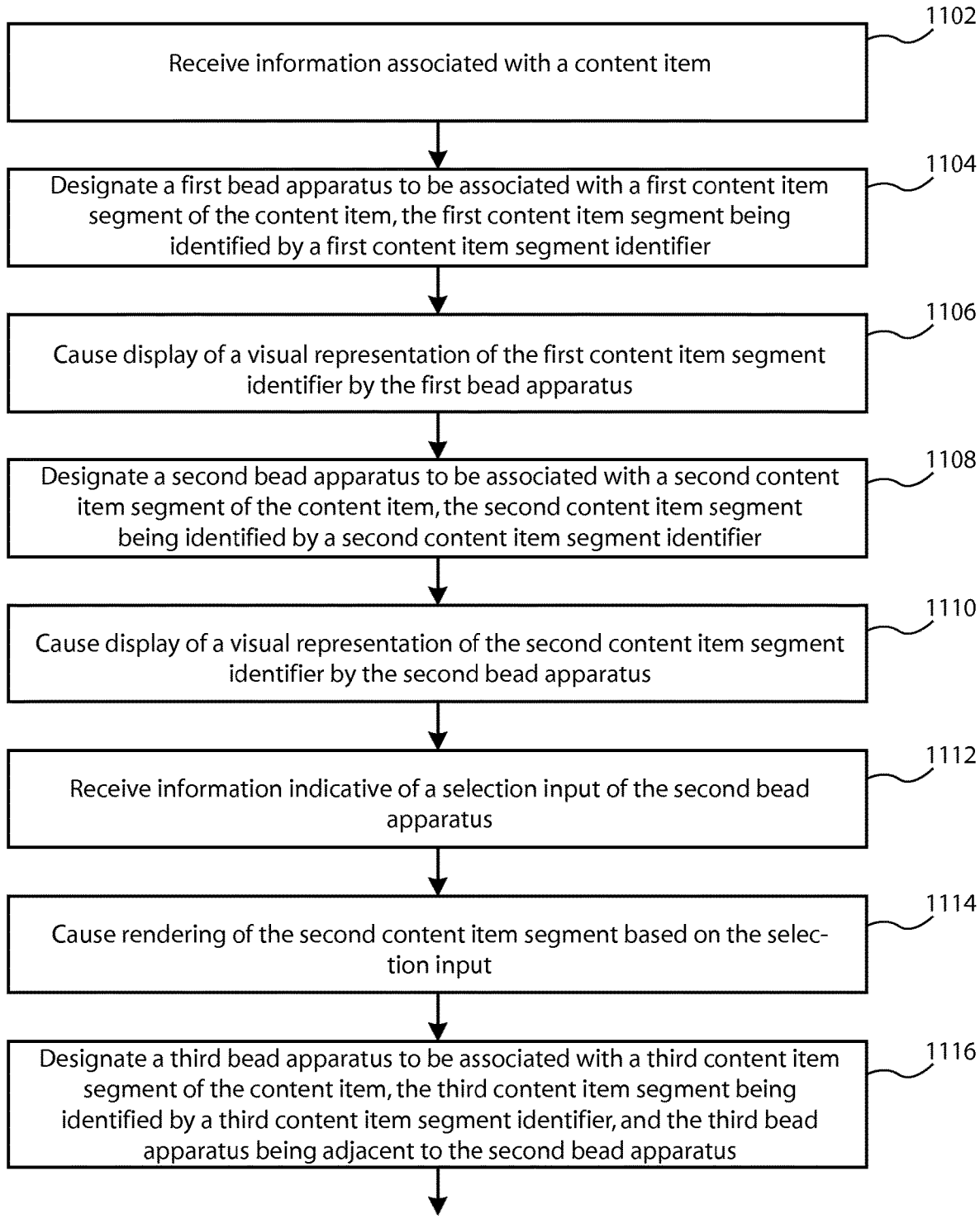
FIG. 11 is a flow diagram illustrating activities associated with causing rendering of a content item segment according to at least one example embodiment.
Figures 2, 11:
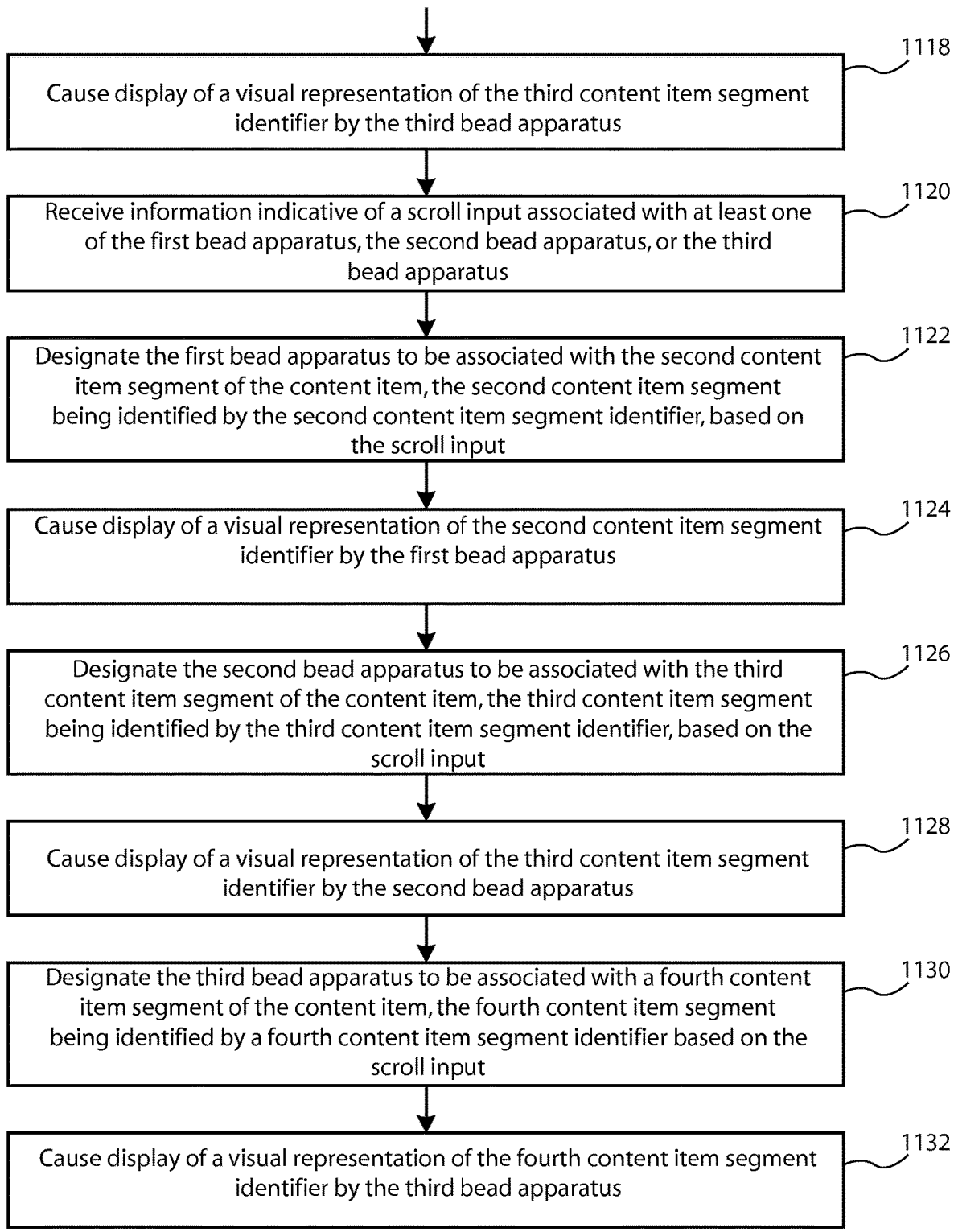

FIG. 11 is a flow diagram illustrating activities associated with causing rendering of a content item segment according to at least one example embodiment. In at least one example embodiment, there is a set of operations that corresponds with the activities of FIG. 11. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 11.

At block 1102, the apparatus receives information associated with a content item, similar as described regarding block 802 of FIG. 8.

At block 1104, the apparatus designates a first bead apparatus to be associated with a first content item segment of the content item, the first content item segment being identified by a first content item segment identifier, similar as described regarding block 804 of FIG. 8.

At block 1106, the apparatus causes display of a visual representation of the first content item segment identifier by the first bead apparatus, similar as described regarding block 806 of FIG. 8.

At block 1108, the apparatus designates a second bead apparatus to be associated with a second content item segment of the content item, the second content item segment being identified by a second content item segment identifier, similar as described regarding block 808 of FIG. 8.

At block 1110, the apparatus causes display of a visual representation of the second content item segment identifier by the second bead apparatus, similar as described regarding block 810 of FIG. 8.

At block 1112, the apparatus receives information indicative of a selection input of the second bead apparatus, similar as described regarding block 812 of FIG. 8.

At block 1114, the apparatus causes rendering of the second content item segment based, at least in part, on the selection input, similar as described regarding block 814 of FIG. 8.

At block 1116, the apparatus designates a third bead apparatus to be associated with a third content item segment of the content item, the third content item segment being identified by a third content item segment identifier, and the third bead apparatus being adjacent to the second bead apparatus. The designation, the third bead apparatus, the third content item segment, the third content item segment identifier, and the adjacency may be similar as described regarding FIG. 6.

At block 1118, the apparatus causes display of a visual representation of the third content item segment identifier by the third bead apparatus. The causation of display and the visual representation of the third content item segment identifier may be similar as described regarding FIG. 6.

At block 1120, the apparatus receives information indicative of a scroll input associated with at least one of the first bead apparatus, the second bead apparatus, or the third bead apparatus. The receipt, the information, the scroll input, and the association of the scroll input may be similar as described regarding FIGS. 5A-5D, FIG. 6, and FIG. 7A-7B.

At block 1122, the apparatus designates the first bead apparatus to be associated with the second content item segment of the content item, the second content item segment being identified by the second content item segment identifier, based, at least in part, on the scroll input. The designation, the second content item segment, the second content item segment identifier, and the adjacency may be similar as described regarding FIG. 6.

At block 1124, the apparatus causes display of a visual representation of the second content item segment identifier by the first bead apparatus. The causation of display and the visual representation of the second content item segment identifier may be similar as described regarding FIG. 6.

At block 1126, the apparatus designates the second bead apparatus to be associated with the third content item segment of the content item, the third content item segment being identified by the third content item segment identifier, based, at least in part, on the scroll input. The designation, the third content item segment, the third content item segment identifier, and the adjacency may be similar as described regarding FIG. 6.

At block 1128, the apparatus causes display of a visual representation of the third content item segment identifier by the second bead apparatus. The causation of display and the visual representation of the third content item segment identifier may be similar as described regarding FIG. 6.

At block 1130, the apparatus designates the third bead apparatus to be associated with a fourth content item segment of the content item, the fourth content item segment being identified by a fourth content item segment identifier based, at least in part, on the scroll input. The designation, the fourth content item segment, the fourth content item segment identifier, and the adjacency may be similar as described regarding FIG. 6.

At block 1132, the apparatus causes display of a visual representation of the fourth content item segment identifier by the third bead apparatus. The causation of display and the visual representation of the fourth content item segment identifier may be similar as described regarding FIG. 6.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 914 of FIG. 9 may be performed after block 918 of FIG. 9. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor; and
   at least one memory including computer program code, the memory and the computer program code configured to, working with the processor, cause the apparatus to perform at least the following:
   receive information associated with a content item;
   designate a first bead apparatus to be associated with a first content item segment of the content item, the first content item segment being identified by a first content item segment identifier;
   cause display of a visual representation of the first content item segment identifier by the first bead apparatus;
   designate a second bead apparatus to be associated with a second content item segment of the content item, the second content item segment being identified by a second content item segment identifier;
   cause display of a visual representation of the second content item segment identifier by the second bead apparatus;
   detect, via one or more sensors of the second bead apparatus, information indicative of a selection input of the second bead apparatus;
   in response to detecting the information indicative of the selection input of the second bead apparatus, cause rendering of the second content item segment based, at least in part, on the selection input, wherein causation of rendering comprises causing information indicative of the second content item segment to be transmitted, over a wireless communication channel, to a separate apparatus so as to cause to display on the separate apparatus the visual representation of the second content item segment identifier concurrent with presentation of the visual representation of the second content item segment identifier by the second bead apparatus;
   determine that the content item segment that is being rendered is an additional content item segment;
   designate the first bead apparatus to be associated with the additional content item segment of the content item based, at least in part, on the determination that the content item segment that is being rendered is the additional content item segment, the additional content item segment being identified by an additional content item segment identifier; and
   cause display of a visual representation of the additional content item segment identifier by the first bead apparatus.

2. The apparatus of claim 1, wherein the memory includes computer program code configured to, working with the processor, cause the apparatus to perform:
   designation of the second bead apparatus to be associated with a third content item segment of the content item, the third content item segment being identified by a third content item segment identifier; and
   causation of display of a visual representation of the third content item segment identifier by the second bead apparatus.

3. The apparatus of Claim 1, wherein the memory includes computer program code configured to, working with the processor, cause the apparatus to perform receipt of information indicative of a current rendering position of the content item corresponding with the additional content item segment, wherein determination that the content item segment that is being rendered is the additional content item segment is based, at least in part, on the information indicative of the current rendering position of the content item corresponding with the additional content item segment.

4. The apparatus of claim 1, wherein designation of the first bead apparatus to be associated with the first content item segment of the content item and designation of the second bead apparatus to be associated with the second content item segment of the content item are based at least in part, on a spatial relationship between the first bead apparatus and the second bead apparatus.

5. The apparatus of claim 1, wherein the first bead apparatus is adjacent to the second bead apparatus, and the memory includes computer program code configured to, working with the processor, cause the apparatus to perform:
designation of a third bead apparatus to be associated with a third content item segment of the content item, the third content item segment being identified by a third content item segment identifier, and the third bead apparatus being adjacent to the second bead apparatus;
causation of display of a visual representation of the third content item segment identifier by the third bead apparatus;
receipt of information indicative of a scroll input associated with at least one of the first bead apparatus, the second bead apparatus, or the third bead apparatus;
designation of the first bead apparatus to be associated with the second content item segment of the content item, the second content item segment being identified by the second content item segment identifier, based, at least in part, on the scroll input;
causation of display of a visual representation of the second content item segment identifier by the first bead apparatus;
designation of the second bead apparatus to be associated with the third content item segment of the content item, the third content item segment being identified by the third content item segment identifier, based, at least in part, on the scroll input;
causation of display of a visual representation of the third content item segment identifier by the second bead apparatus;
designation of the third bead apparatus to be associated with a fourth content item segment of the content item, the fourth content item segment being identified by a fourth content item segment identifier based, at least in part, on the scroll input; and
causation of display of a visual representation of the fourth content item segment identifier by the third bead apparatus.

6. The apparatus of claim 1, wherein the content item segment is a portion of the content item, and the content item segment is based, at least in part, on a type of the content item.

7. The apparatus of claim 1, wherein the apparatus is the first bead apparatus.

8. The apparatus of claim 1, wherein the first content item segment is chronologically adjacent to the second content segment, and the second content segment is chronologically adjacent to the additional content item segment.

9. A method comprising:
receiving information associated with a content item;
designating a first bead apparatus to be associated with a first content item segment of the content item, the first content item segment being identified by a first content item segment identifier;
causing display of a visual representation of the first content item segment identifier by the first bead apparatus;
designating a second bead apparatus to be associated with a second content item segment of the content item, the second content item segment being identified by a second content item segment identifier;
causing display of a visual representation of the second content item segment identifier by the second bead apparatus;
detecting, via one or more sensors of the second bead apparatus, information indicative of a selection input of the second bead apparatus;
in response to detecting the information indicative of the selection input of the second bead apparatus, causing rendering of the second content item segment based, at least in part, on the selection input, wherein causation of rendering comprises causing information indicative of the second content item segment to be transmitted, over a wireless communication channel, to a separate apparatus so as to cause to display on the separate apparatus the visual representation of the second content item segment identifier concurrent with presentation of the visual representation of the second content item segment identifier by the second bead apparatus;
determining that the content item segment that is being rendered is an additional content item segment;
designating the first bead apparatus to be associated with the additional content item segment of the content item based, at least in part, on the determination that the content item segment that is being rendered is the additional content item segment, the additional content item segment being identified by an additional content item segment identifier; and
causing display of a visual representation of the additional content item segment identifier by the first bead apparatus.

10. The method of claim 9, further comprising:
designating the second bead apparatus to be associated with a third content item segment of the content item, the third content item segment being identified by a third content item segment identifier; and
causing display of a visual representation of the third content item segment identifier by the second bead apparatus.

11. The method of Claim 9, further comprising receiving of information indicative of a current rendering position of the content item corresponding with the additional content item segment, wherein determination that the content item segment that is being rendered is the additional content item segment is based, at least in part, on the information indicative of the current rendering position of the content item corresponding with the additional content item segment.

12. The method of claim 9, wherein designation of the first bead apparatus to be associated with the first content item segment of the content item and designation of the second bead apparatus to be associated with the second content item segment of the content item are based at least in part, on a spatial relationship between the first bead apparatus and the second bead apparatus.

13. The method of claim 9, wherein the first bead apparatus is adjacent to the second bead apparatus, and further comprising:

designation of a third bead apparatus to be associated with a third content item segment of the content item, the third content item segment being identified by a third content item segment identifier, and the third bead apparatus being adjacent to the second bead apparatus;

causation of display of a visual representation of the third content item segment identifier by the third bead apparatus;

receipt of information indicative of a scroll input associated with at least one of the first bead apparatus, the second bead apparatus, or the third bead apparatus;

designation of the first bead apparatus to be associated with the second content item segment of the content item, the second content item segment being identified by the second content item segment identifier, based, at least in part, on the scroll input;

causation of display of a visual representation of the second content item segment identifier by the first bead apparatus;

designation of the second bead apparatus to be associated with the third content item segment of the content item, the third content item segment being identified by the third content item segment identifier, based, at least in part, on the scroll input;

causation of display of a visual representation of the third content item segment identifier by the second bead apparatus;

designation of the third bead apparatus to be associated with a fourth content item segment of the content item, the fourth content item segment being identified by a fourth content item segment identifier based, at least in part, on the scroll input; and causation of display of a visual representation of the fourth content item segment identifier by the third bead apparatus.

14. The method of claim 9, wherein the content item segment is a portion of the content item, and the content item segment is based, at least in part, on a type of the content item.

15. The method of claim 9, wherein the first content item segment is chronologically adjacent to the second content segment, and the second content segment is chronologically adjacent to the additional content item segment.

16. At least one computer-readable medium encoded with instructions that, when executed by a processor, perform:

receiving information associated with a content item;

designating a first bead apparatus to be associated with a first content item segment of the content item, the first content item segment being identified by a first content item segment identifier;

causing display of a visual representation of the first content item segment identifier by the first bead apparatus;

designating a second bead apparatus to be associated with a second content item segment of the content item, the second content item segment being identified by a second content item segment identifier;

causing display of a visual representation of the second content item segment identifier by the second bead apparatus;

detecting, via one or more sensors of the second bead apparatus, information indicative of a selection input of the second bead apparatus;

in response to detecting the information indicative of the selection input of the second bead apparatus, causing rendering of the second content item segment based, at least in part, on the selection input, wherein causation of rendering comprises causing information indicative of the second content item segment to be transmitted, over a wireless communication channel, to a separate apparatus so as to cause to display on the separate apparatus the visual representation of the second content item segment identifier concurrent with presentation of the visual representation of the second content item segment identifier by the second bead apparatus;

determining that the content item segment that is being rendered is an additional content item segment;

designating the first bead apparatus to be associated with the additional content item segment of the content item based, at least in part, on the determination that the content item segment that is being rendered is the additional content item segment, the additional content item segment being identified by an additional content item segment identifier; and causing display of a visual representation of the additional content item segment identifier by the first bead apparatus.

17. The medium of claim 16, wherein the medium is further encoded with instructions that, when executed by the processor, perform:

designating the second bead apparatus to be associated with a third content item segment of the content item, the third content item segment being identified by a third content item segment identifier; and causing display of a visual representation of the third content item segment identifier by the second bead apparatus.

18. The medium of claim 16, wherein designation of the first bead apparatus to be associated with the first content item segment of the content item and designation of the second bead apparatus to be associated with the second content item segment of the content item are based at least in part, on a spatial relationship between the first bead apparatus and the second bead apparatus.

19. The medium of claim 16, wherein the medium is further encoded with instructions that, when executed by the processor, perform:

designation of a third bead apparatus to be associated with a third content item segment of the content item, the third content item segment being identified by a third content item segment identifier, and the third bead apparatus being adjacent to the second bead apparatus;

causation of display of a visual representation of the third content item segment identifier by the third bead apparatus;

receipt of information indicative of a scroll input associated with at least one of the first bead apparatus, the second bead apparatus, or the third bead apparatus;

designation of the first bead apparatus to be associated with the second content item segment of the content item, the second content item segment being identified by the second content item segment identifier, based, at least in part, on the scroll input;

causation of display of a visual representation of the second content item segment identifier by the first bead apparatus.

20. The medium of claim 16, wherein the first content item segment is chronologically adjacent to the second content segment, and the second content segment is chronologically adjacent to the additional content item segment.

* * * * *